US011748991B1

(12) United States Patent
Day et al.

(10) Patent No.: US 11,748,991 B1
(45) Date of Patent: Sep. 5, 2023

(54) IP SECURITY CAMERA COMBINING BOTH INFRARED AND VISIBLE LIGHT ILLUMINATION PLUS SENSOR FUSION TO ACHIEVE COLOR IMAGING IN ZERO AND LOW LIGHT SITUATIONS

(71) Applicant: Ambarella, Inc., Santa Clara, CA (US)

(72) Inventors: Christopher N. Day, Los Gatos, CA (US); Ruian Xu, San Jose, CA (US)

(73) Assignee: Ambarella International LP, Santa Clara, CA (US)

( * ) Notice: Subject to any disclaimer, the term of this patent is extended or adjusted under 35 U.S.C. 154(b) by 6 days.

(21) Appl. No.: 16/520,754

(22) Filed: Jul. 24, 2019

(51) Int. Cl.
*B60Q 3/74* (2017.01)
*G06T 7/20* (2017.01)
*B60Q 1/32* (2006.01)
*H04N 7/18* (2006.01)
*G06V 20/52* (2022.01)
*B60Q 3/85* (2017.01)
*G06V 40/16* (2022.01)
*H04N 23/11* (2023.01)
*H04N 23/57* (2023.01)
*H04N 23/74* (2023.01)

(52) U.S. Cl.
CPC .............. *G06V 20/52* (2022.01); *B60Q 1/323* (2013.01); *B60Q 3/74* (2017.02); *B60Q 3/85* (2017.02); *G06T 7/20* (2013.01); *G06V 40/165* (2022.01); *H04N 7/188* (2013.01); *H04N 23/11* (2023.01); *H04N 23/57* (2023.01); *H04N 23/74* (2023.01)

(58) Field of Classification Search
CPC ....... H04N 5/332; H04N 5/2257; H04N 7/188; H04N 5/2354; G06K 9/00771; G06K 9/00248; B60Q 1/323; B60Q 3/85; B60Q 3/74
See application file for complete search history.

(56) References Cited

U.S. PATENT DOCUMENTS

| | | | | |
|---|---|---|---|---|
| 5,289,321 | A * | 2/1994 | Secor | B60K 35/00 359/896 |
| 6,137,407 | A * | 10/2000 | Akagawa et al. | G08B 13/19 340/541 |
| 9,643,722 | B1 * | 5/2017 | Myslinski | G06V 40/10 |
| 2003/0146372 | A1 * | 8/2003 | Hsish et al. | H04N 5/2257 250/214.1 |
| 2006/0227997 | A1 * | 10/2006 | Au et al. | G08B 25/14 382/103 |
| 2008/0297611 | A1 * | 12/2008 | Qiu et al. | H04N 5/2351 348/211.3 |
| 2012/0002012 | A1 * | 1/2012 | O'Grady et al. | A61B 6/022 348/E13.001 |
| 2012/0206050 | A1 * | 8/2012 | Spero | B60Q 1/1423 315/152 |
| 2012/0293561 | A1 * | 11/2012 | Chen | G09G 3/3413 345/690 |
| 2013/0215007 | A1 * | 8/2013 | Hung | G06F 1/1677 345/156 |
| 2014/0107846 | A1 * | 4/2014 | Li | G05B 15/02 700/275 |

(Continued)

*Primary Examiner* — Shawn S An
(74) *Attorney, Agent, or Firm* — Christopher P. Maiorana, PC

(57) ABSTRACT

An apparatus includes a first light source, a second light source, an image sensor circuit, and a processing circuit. The first light source is generally capable of emitting infrared light. The second light source is generally capable of emitting visible light. The image sensor circuit is generally responsive to both the infrared light and the visible light. The processing circuit is generally coupled to the image sensor circuit and configured to generate an image comprising both infrared information and color information.

20 Claims, 12 Drawing Sheets

(56) References Cited

U.S. PATENT DOCUMENTS

| | | | |
|---|---|---|---|
| 2015/0042789 A1* | 2/2015 | Inwood et al. | G01B 11/026 348/135 |
| 2015/0062347 A1* | 3/2015 | Jin | H04N 5/332 348/164 |
| 2016/0091308 A1* | 3/2016 | Oliaei | G06F 3/04883 367/87 |
| 2016/0255055 A1* | 9/2016 | Sanz et al. | G06Q 20/401 713/168 |
| 2017/0251035 A1* | 8/2017 | Siminoff et al. | H04L 65/612 |
| 2018/0248699 A1* | 8/2018 | Andrade | H04L 9/0897 |
| 2019/0199898 A1* | 6/2019 | Yonishi | G06K 9/6288 |
| 2019/0213389 A1* | 7/2019 | Peruch et al. | G06T 7/10 |
| 2019/0384900 A1* | 12/2019 | Kosugi | G06V 40/172 |
| 2020/0007921 A1* | 1/2020 | Ojala | H04N 21/6587 |
| 2020/0085254 A1* | 3/2020 | Yoo et al. | A45D 20/14 |
| 2021/0113174 A1* | 4/2021 | Xu et al. | G06T 3/4038 |

\* cited by examiner

IP SECURITY CAMERA COMBINING BOTH INFRARED AND VISIBLE LIGHT ILLUMINATION PLUS SENSOR FUSION TO ACHIEVE COLOR IMAGING IN ZERO AND LOW LIGHT SITUATIONS

FIELD OF THE INVENTION

The invention relates to security cameras generally and, more particularly, to a method and/or apparatus for implementing an internet protocol (IP) security camera combining both infrared (IR) and visible light illumination plus sensor fusion to achieve color imaging in zero and low light situations.

BACKGROUND

Security cameras may employ infrared (IR) light illumination to allow the cameras to see in zero light or very low light situations. The use of IR light illumination produces an image that is only black and white, losing the color information from the original image.

It would be desirable to implement an internet protocol (IP) security camera combining both infrared (IR) and visible light illumination plus sensor fusion to achieve color imaging in zero and low light situations.

SUMMARY

The invention concerns an apparatus including a first light source, a second light source, an image sensor circuit, and a processing circuit. The first light source is generally capable of emitting infrared light. The second light source is generally capable of emitting visible light. The image sensor circuit is generally responsive to both the infrared light and the visible light. The processing circuit is generally coupled to the image sensor circuit and configured to generate an image comprising both infrared information and color information.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing an internet protocol (IP) security camera combining both infrared (IR) light and visible light illumination plus sensor fusion to achieve color imaging in zero and low light situations that may (i) capture an image illuminated by an infrared light source, (ii) simultaneously capture color information from the same image when illuminated by a source of visible light, (iii) fuse together the IR image information and the color information to generate a single image with the attributes of the original black and white IR image plus the color information, (iv) utilize both white light and IR light emitting diodes (LEDs) for scene illumination, (v) utilize low ambient visible light to capture color information, (vi) provide low power or battery operation, (vii) automatically determine whether supplemental visible light is needed to acquire color information, and/or (viii) be implemented as one or more integrated circuits.

In various embodiments, a camera is implemented that employs an RGB-IR sensor to capture an image simultaneously illuminated by a source of infrared (IR) light and a source of visible light. The camera may be configured to obtain both black and white information and color information from the captured RGB-IR image. The RGB-IR image and the color information may then be fused together to generate a single composite image with the attributes of the original black and white RGB-IR image plus color information.

In various embodiments, the camera may be configured to utilize one or more white light LEDs and one or more infrared (IR) LEDs to provide both visible and infrared light illumination in zero light environments. The amount of visible light illumination needed to provide color information may be significantly less than a conventional camera employing only visible light sources. In various embodiments, a camera may be provided that utilizes less power, has a smaller form factor, and has lower cost than cameras integrating full spot light capability. Applications may include, but are not limited to, video doorbell cameras, exterior and/or interior surveillance/security cameras, vehicle cabin monitoring cameras, and battery powered cameras.

Figure 1:
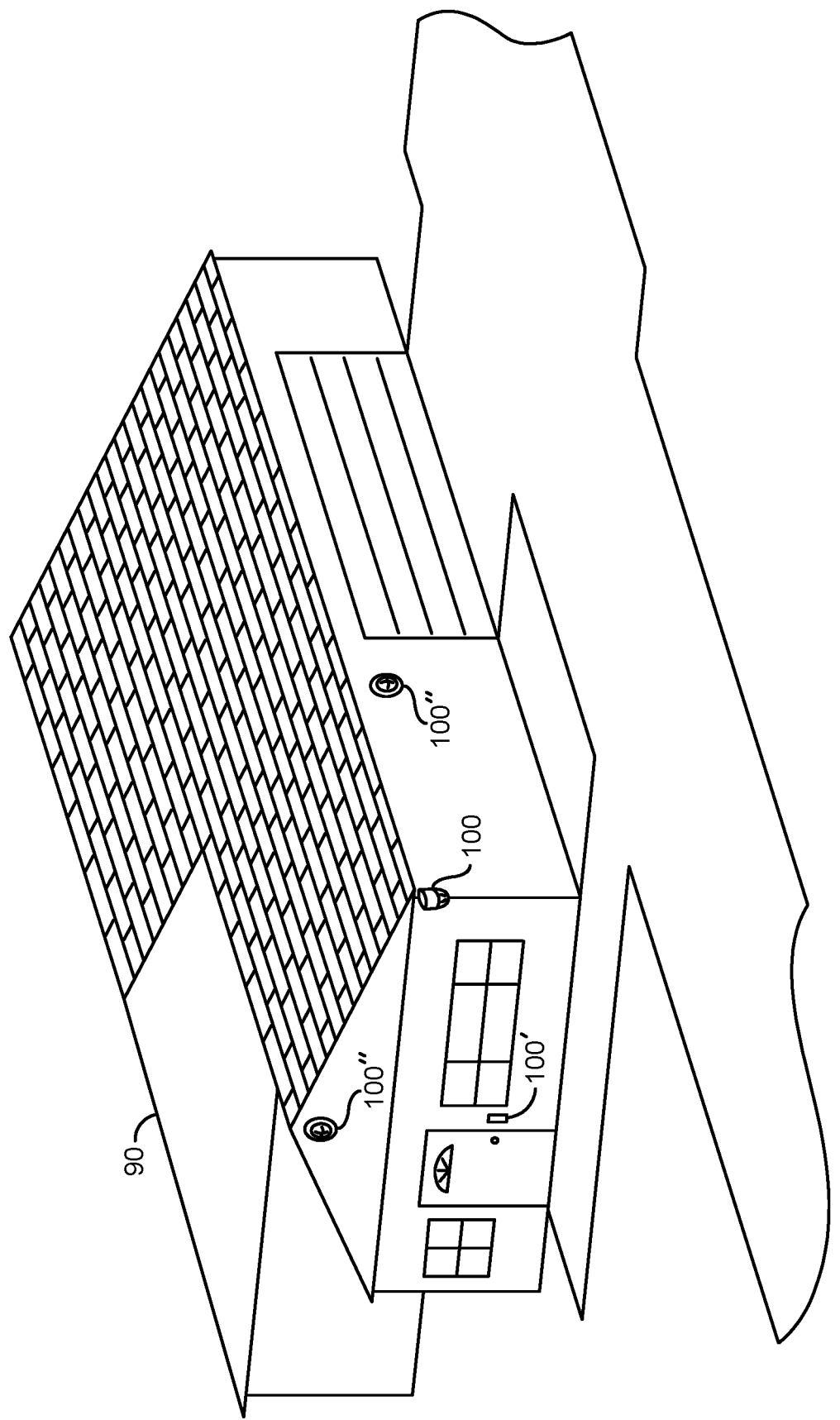
FIG. 1 is a diagram illustrating a context of an example embodiment of the invention.

Referring to FIG. 1, a diagram is shown illustrating a context in which an example embodiment of the invention may be implemented. In an example, a residential setting may include a house 90. The house 90 may present a number of locations that may be monitored for security purposes. In an example, a camera 100 may be attached to the house 90 facing a driveway area and/or a side of the house 90 facing a side yard or front door pathway (e.g., illustrated as cameras 100, 100', and 100''). In an example, the cameras 100, 100', and 100'' may be mounted to a wall or a soffit of the house 90. In another example, the camera 100 may be implemented as a doorbell camera mounted near a door of the house 90 (e.g., illustrated as the camera 100'). The camera 100 is generally directed toward an environment adjacent to house 90 to be monitored. In an example, the camera 100 may be configured for low power operation (e.g., a battery-powered camera).

In an example embodiment, the camera 100 may comprise an RGB-IR image sensor, an infrared light source, a visible (e.g., white) light source, and a motion detector. The image sensor, light sources, and motion detector may be directed toward the environment to be monitored. In various embodiments, the light sources may be implemented as light emitting diodes (LEDs). In an example, the motion detector may be implemented as a passive infrared (PIR) sensor. Passive infrared (PIR) sensors generally use very little power. In various embodiments, the camera 100 may be configured to remain in a power down state until motion is detected. In an example, the motion detector may be activated while the image sensor and light sources are inactive. When motion is detected, the image sensor and infrared light source (e.g., one or more IR LEDs) may be activated to allow the camera 100 to confirm and/or identify a source of the detected motion. When an object is identified as being close enough to allow capture of color information, the camera 100 may determine whether sufficient ambient visible light is present and/or turn on the visible light source.

In an example, the camera 100 may be configured to cover a wide field of view (FOV). In an example, the field of view may encompass the area including the driveway, the area adjacent to the front door, or some other area around the house 90 to be monitored. In an example, the camera 100 may a camera system on chip (SoC) coupled to the RGB-IR image sensor, the light sources, and the motion detector. In various embodiments, the camera system on chip is generally configured to operate in low or no light environments, and to use very little power.

In an example operation, the motion detector may be in the activated state and the RGB-IR image sensor and light sources may be in a non-activated stated. When an object moves to the monitored area, the motion detector may be triggered. In response to the motion sensor being triggered, the camera SoC may turn on the RGB-IR image sensor and one or more infrared (IR) LEDs. When the RGB-IR image sensor and IR LEDs are activated, the camera SoC may start generating a video stream comprising black and white (BW) video captured from the RGB-IR image sensor. The visible light source may be left in the non-activated state during this time. When the object moves closer (e.g., towards the front door), the white light LED may be turned on and the camera SoC may start capturing color information from the RGB-IR image sensor. The camera SoC may be configured to fuse the black and white IR image and color information from the RGB-IR sensor. In an example, objects closer to the camera 100 may appear in color, while objects farther away and in background areas generally remain in black and white.

Figure 2:
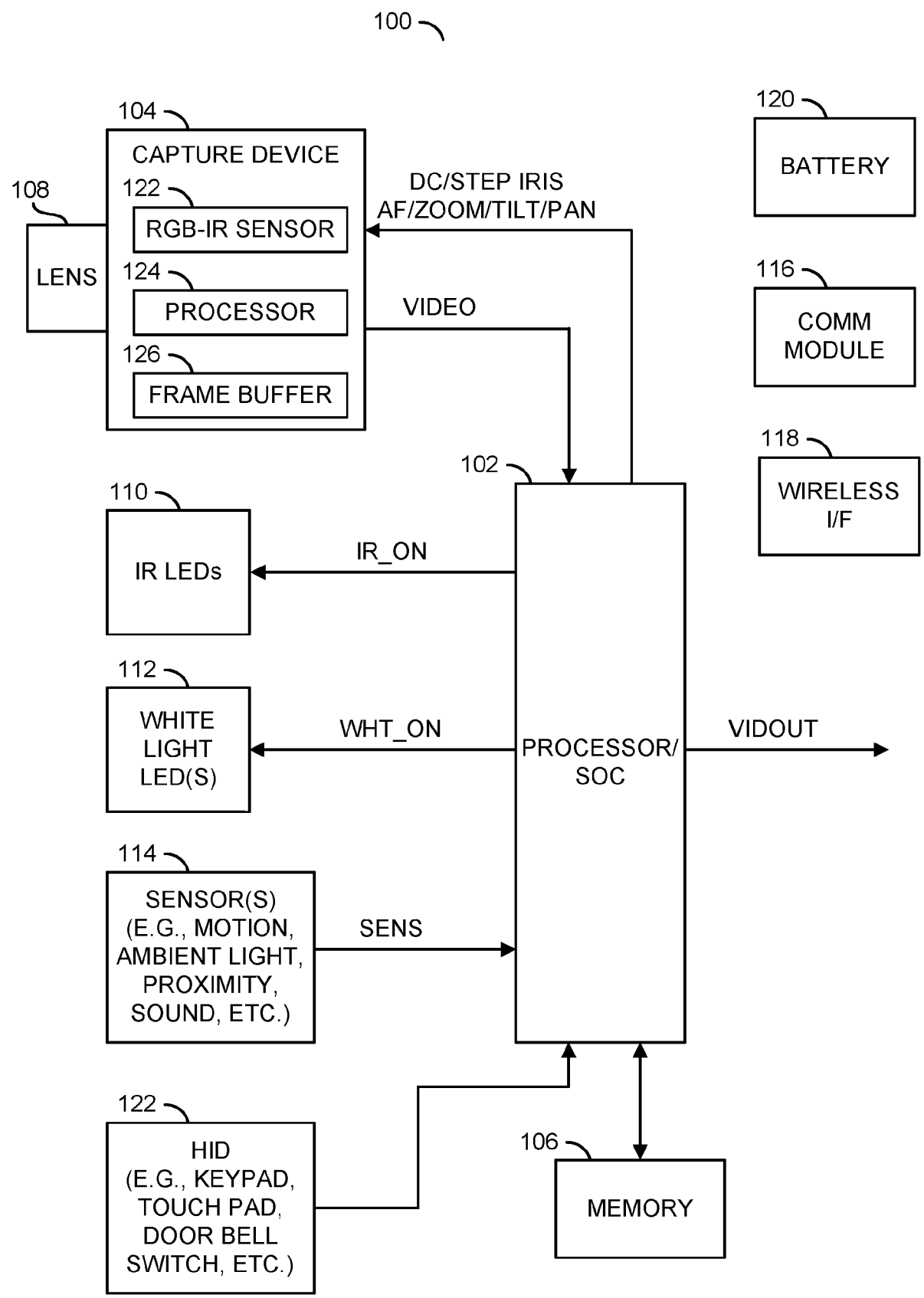
FIG. 2 is a schematic diagram illustrating components of a camera in accordance with an example embodiment of the invention.

Referring to FIG. 2, a block diagram of the camera 100 is shown illustrating an example implementation. In an example, the camera 100 may comprise a block (or circuit) 102, a block (or circuit) 104, a block (or circuit) 106, a block (or circuit) 108, a block (or circuit) 110, a block (or circuit) 112, a block (or circuit) 114, a block (or circuit) 116, a block (or circuit) 118, and/or a block (or circuit) 120. The circuit 112 may be implemented as a memory. The block 114 may be a communication module. The block 116 may be implemented as a battery. The circuit 102 may be implemented as a system on Chip (SoC) 102. The circuit 104 may be implemented as a capture device. The circuit 106 may be implemented as a memory. The block 108 may be implemented as a lens. The circuit 110 may be implemented as one or more infrared (IR) light emitting diodes (LEDs). The circuit 112 may be implemented as one or more visible (e.g., white) light emitting diodes (LEDs). The circuit 114 may be implemented as one or more sensors. The circuit 116 may be implemented as a communication device. The circuit 118 may be implemented as a wireless interface. The circuit 120 may be implemented as a battery 120. In some embodiments, the camera 100 may comprise the SoC 102, the image sensor 104, the memory 106, the lens 108, the IR LEDs 110, the visible light LEDs 112, the sensors 114, the communication module 116, the wireless interface 118, and the battery 120. In another example, the camera 100 may comprise the capture device 104, the lens 108, the IR LEDs 110, the visible light LEDs 112, and the sensors 114, and the SoC 102, the memory 106, the communication module 116, the wireless interface 118, and the battery 120 may be components of a separate device. The implementation of the camera 100 may be varied according to the design criteria of a particular implementation.

The lens 108 may be attached to the capture device 104. In an example, the capture device 104 may comprise a block (or circuit) 122, a block (or circuit) 124, and a block (or circuit) 126. The circuit 122 may be an RGB-IR image sensor. The circuit 124 may be a processor and/or logic. The circuit 126 may be a memory circuit (e.g., a frame buffer).

The capture device 104 may be configured to capture video image data (e.g., light collected and focused by the lens 108). The capture device 104 may capture data received through the lens 108 to generate a video bitstream (e.g., a sequence of video frames). In various embodiments, the lens 108 may be implemented as a fixed focus lens. A fixed focus lens generally facilitates smaller size and low power. In an example, a fixed focus lens may be used in battery powered and doorbell camera applications. In some embodiments, the lens 108 may be directed, tilted, panned, zoomed and/or rotated to capture the environment surrounding the camera 100 (e.g., capture data from the field of view). In an example, professional camera models may be implemented with an active lens system for enhanced functionality, remote control, etc.

The capture device 104 may transform the received light into a digital data stream. In some embodiments, the capture device 104 may perform an analog to digital conversion. For example, the image sensor 122 may perform a photoelectric conversion of the light received by the lens 108. The processor 124 may transform the digital data stream into a video data stream (or bitstream), a video file, and/or a number of video frames. In an example, the capture device 104 may present the video data as a digital video signal (e.g., VIDEO). The digital video signal may comprise the video frames (e.g., sequential digital images and/or audio).

The video data captured by the capture device 104 may be represented as a signal/bitstream/data VIDEO (e.g., a digital video signal). The capture device 104 may present the signal VIDEO to the processor/SoC 102. The signal VIDEO may represent the video frames/video data. The signal VIDEO may be a video stream captured by the capture device 104.

The image sensor 122 may receive light from the lens 108 and transform the light into digital data (e.g., the bitstream). For example, the image sensor 122 may perform a photoelectric conversion of the light from the lens 108. In some embodiments, the image sensor 122 may have extra margins that are not used as part of the image output. In some embodiments, the image sensor 122 may not have extra margins. In various embodiments, the image sensor 122 may be configured to generate an RGB-IR video signal. In an infrared light only illuminated field of view, the image sensor 122 may generate a monochrome (B/W) video signal. In a field of view illuminated by both IR light and visible light, the image sensor 122 may be configured to generate color information in addition to the monochrome video signal. In various embodiments, the image sensor 122 may be configured to generate a video signal in response to visible and/or infrared (IR) light.

The processor/logic 124 may transform the bitstream into a human viewable content (e.g., video data that may be understandable to an average person regardless of image quality, such as the video frames). For example, the processor 124 may receive pure (e.g., raw) data from the RGB-IR sensor 122 and generate (e.g., encode) video data (e.g., the bitstream) based on the raw data. The capture device 104 may have the memory 126 to store the raw data and/or the processed bitstream. For example, the capture device 104 may implement the frame memory and/or buffer 126 to store (e.g., provide temporary storage and/or cache) one or more of the video frames (e.g., the digital video signal). In some embodiments, the processor/logic 124 may perform analysis and/or correction on the video frames stored in the memory/buffer 126 of the capture device 104.

The sensors 114 may implement a number of sensors including, but not limited to, motion sensors, ambient light sensors, proximity sensors (e.g., ultrasound, radar, lidar, etc.), audio sensors (e.g., a microphone), etc. In embodiments implementing a motion sensor, the sensors 114 may be configured to detect motion anywhere in the field of view monitored by the camera 100. In various embodiments, the detection of motion may be used as one threshold for activating the capture device 104. The sensors 114 may be implemented as an internal component of the camera 100 and/or as a component external to the camera 100. In an example, the sensors 114 may be implemented as a passive infrared (PIR) sensor. In another example, the sensors 114 may be implemented as a smart motion sensor. In embodiments implementing the smart motion sensor, the sensors 114 may comprise a low resolution image sensor configured to detect motion and/or persons.

In various embodiments, the sensors 114 may generate a signal (e.g., SENS). The signal SENS may comprise a variety of data (or information) collected by the sensors 114. In an example, the signal SENS may comprise data collected in response to motion being detected in the monitored field of view, an ambient light level in the monitored field of view, and/or sounds picked up in the monitored field of view. However, other types of data may be collected and/or generated based upon design criteria of a particular application. The signal SENS may be presented to the processor/SoC 102. In an example, the sensors 114 may generate (assert) the signal SENS when motion is detected in the field of view monitored by the camera 100. In another example, the sensors 114 may generate (assert) the signal SENS when triggered by audio in the field of view monitored by the camera 100. In still another example, the sensors 114 may be configured to provide directional information with respect to motion and/or sound detected in the field of view. The directional information may also be communicated to the processor/SoC 102 via the signal SENS.

The processor/SoC 102 may be configured to execute computer readable code and/or process information. In various embodiments, the computer readable code may be stored within the processor/SoC 102 (e.g., microcode, etc.) and/or in the memory 106. The processor/SoC 102 may be configured to receive input from and/or present output to the memory 106. The processor/SoC 102 may be configured to present and/or receive other signals (not shown). The number and/or types of inputs and/or outputs of the processor/SoC 102 may be varied according to the design criteria of a particular implementation. The processor/SoC 102 may be configured for low power (e.g., battery) operation.

The processor/SoC 102 may receive the signal VIDEO and the signal SENS. The processor/SoC 102 may generate a video output signal (e.g., VIDOUT) based on the signal VIDEO, the signal SENS, and/or other input. In some embodiments, the signal VIDOUT may be generated based on analysis of the signal VIDEO and/or objects detected in the signal VIDEO. In various embodiments, the processor/SoC 102 may be configured to perform one or more of feature extraction, object detection, object tracking, and object identification. For example, the processor/SoC 102 may determine motion information by analyzing a frame from the signal VIDEO and comparing the frame to a previous frame. The comparison may be used to perform digital motion estimation. In some embodiments, the processor/SoC 102 may be configured to generate the video output signal VIDOUT comprising video data from the signal VIDEO. The video output signal VIDOUT may be presented to the memory 106, the communications module 116, and/or the wireless interface 118.

The memory 106 may store data. The memory 106 may implement various types of memory including, but not limited to, as a cache, flash memory, memory card, random access memory (RAM), dynamic RAM (DRAM) memory, etc. The type and/or size of the memory 106 may be varied according to the design criteria of a particular implementation. The data stored in the memory 106 may correspond to a video file, motion information (e.g., readings from the sensors 114), video fusion parameters, image stabilization parameters, user inputs, and/or metadata information.

The lens 108 (e.g., camera lens) may be directed to provide a view of an environment surrounding the camera 100. The lens 108 may be aimed to capture environmental data (e.g., light). The lens 108 may be wide-angle lenses and/or fish-eye lenses (e.g., lenses capable of capturing a wide field of view). The lens 108 may be configured to capture and/or focus the light for the capture device 104. Generally, the image sensor 122 is located behind the lens 108. Based on the captured light from the lens 108, the capture device 104 may generate a bitstream and/or video data.

The communications module 116 may be configured to implement one or more communications protocols. For example, the communications module 116 and the wireless interface 118 may be configured to implement one or more of, IEEE 802.11, IEEE 802.15, IEEE 802.15.1, IEEE 802.15.2, IEEE 802.15.3, IEEE 802.15.4, IEEE 802.15.5, IEEE 802.20, Bluetooth®, and/or ZigBee®. In some embodiments, the wireless interface 118 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera 100 is implemented as a wireless camera, the protocol implemented by the communications module 116 and wireless interface 118 may be a wireless communications protocol. The type of communications protocols implemented by the communications module 116 may be varied according to the design criteria of a particular implementation.

The communications module 116 and/or the wireless interface 118 may be configured to generate a broadcast signal as an output from the camera 100. The broadcast signal may send the video data VIDOUT to external devices. For example, the broadcast signal may be sent to a cloud storage service (e.g., a storage service capable of scaling on demand). In some embodiments, the communications module 116 may not transmit data until the processor/SoC 102 has performed video analytics to determine that an object is in the field of view of the camera 100.

In some embodiments, the communications module 116 may be configured to generate a manual control signal. The manual control signal may be generated in response to a signal from a user received by the communications module 116. The manual control signal may be configured to activate the processor/SoC 102. The processor/SoC 102 may be activated in response to the manual control signal regardless of the power state of the camera 100.

In some embodiments, the camera 100 may include a battery 120 configured to provide power for the various components of the camera 100. The multi-step approach to activating and/or disabling the capture device 104 based on the output of the motion sensor 114 and/or any other power consuming features of the camera 100 may be implemented to reduce a power consumption of the camera 100 and extend an operational lifetime of the battery 120. The motion sensor 114 may have a very low drain on the battery 120 (e.g., less than 10 µW). In an example, the motion sensor 114 may be configured to remain on (e.g., always active) unless disabled in response to feedback from the processor/SoC 102. The video analytics performed by the processor/SoC 102 may have a large drain on the battery 120 (e.g., greater than the motion sensor 114). In an example, the processor/SoC 102 may be in a low-power state (or power-down) until some motion is detected by the motion sensor 114.

The camera 100 may be configured to operate using various power states. For example, in the power-down state (e.g., a sleep state, a low-power state) the motion sensor 114 and the processor/SoC 102 may be on and other components of the camera 100 (e.g., the image capture device 104, the memory 106, the communications module 116, etc.) may be off. In another example, the camera 100 may operate in an intermediate state. In the intermediate state, the image capture device 104 may be on and the memory 106 and/or the communications module 116 may be off. In yet another example, the camera 100 may operate in a power-on (or high power) state. In the power-on state, the motion sensor 114, the processor/SoC 102, the capture device 104, the memory 106, and/or the communications module 116 may be on. The camera 100 may consume some power from the battery 120 in the power-down state (e.g., a relatively small and/or minimal amount of power). The camera 100 may consume more power from the battery 120 in the power-on state. The number of power states and/or the components of the camera 100 that are on while the camera 100 operates in each of the power states may be varied according to the design criteria of a particular implementation.

In some embodiments, the camera 100 may include a keypad, a touch pad (or screen), a doorbell switch, and/or other human interface devices (HIDs) 122. In an example, the sensors 114 may be configured to determine when an object is in proximity to the HIDs 122. In an example where the camera 100 is implemented as part of an access control application, the white light LED 112 may be turned on to provide illumination for identifying a person attempting access, illumination of a lock area, and/or illumination for an access touch pad.

Figure 3:
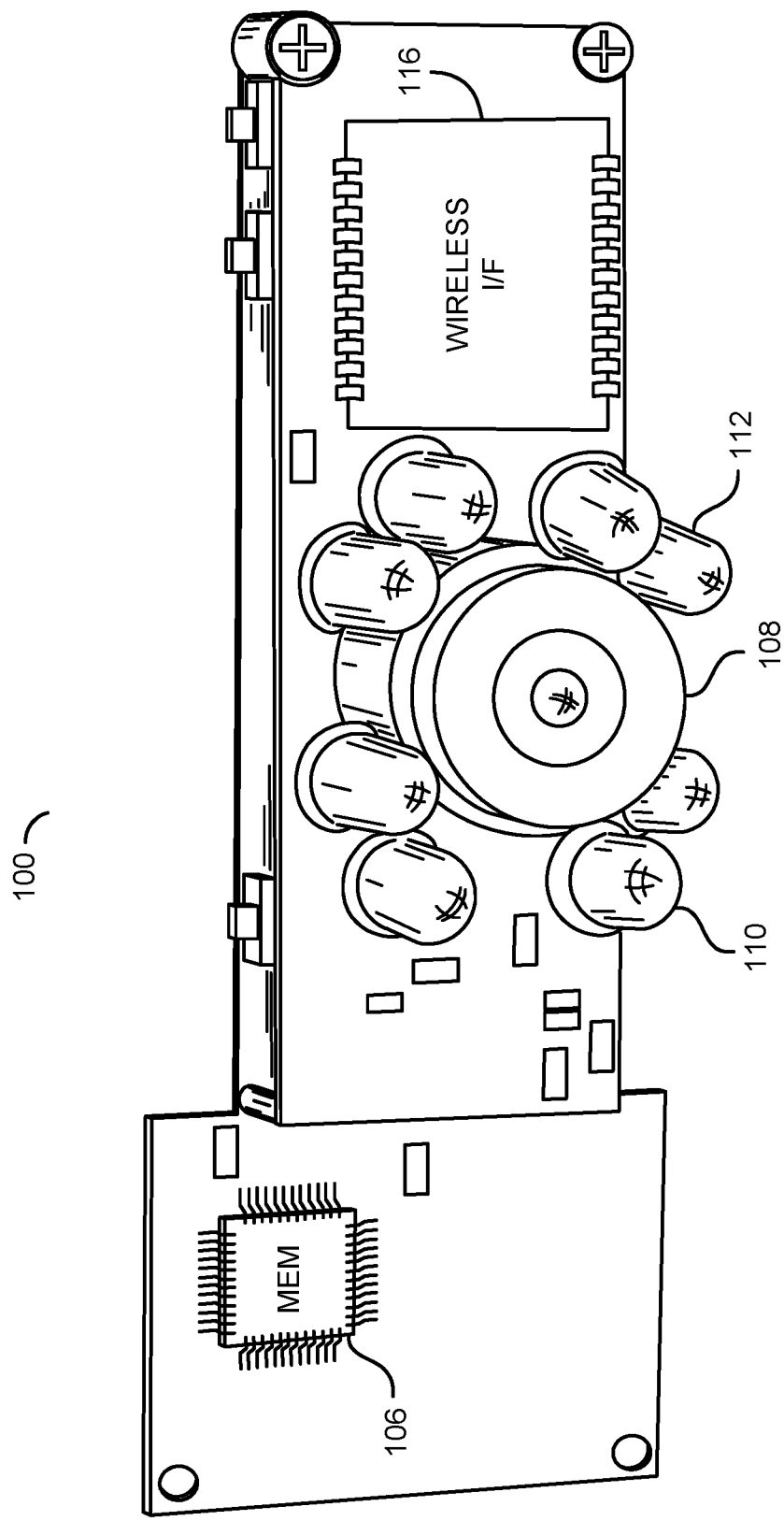
FIG. 3 is a diagram illustrating an example implementation of a camera in accordance with an example embodiment of the invention.

Referring to FIG. 3, a diagram is shown illustrating an example implementation of the camera 100 in accordance with an embodiment of the invention. In various embodiments, the camera 100 may comprise one or more circuit boards. In embodiments implementing more than one circuit board, the printed circuit boards may be mounted together. In an example, a first printed circuit board may include the lens 108, a number of IR LEDs 110, one or more visible (white) light LEDs 112, and the wireless interface circuit (or module) 118, and a second printed circuit board may include the memory circuit (or chip) 106, the processor/SoC 102 and the RGB-IR image sensor 104 (obscured by the first printed circuit board). In one example, the wireless interface 118 may comprise a pre-certified wireless/cellular protocol module.

Figure 4:
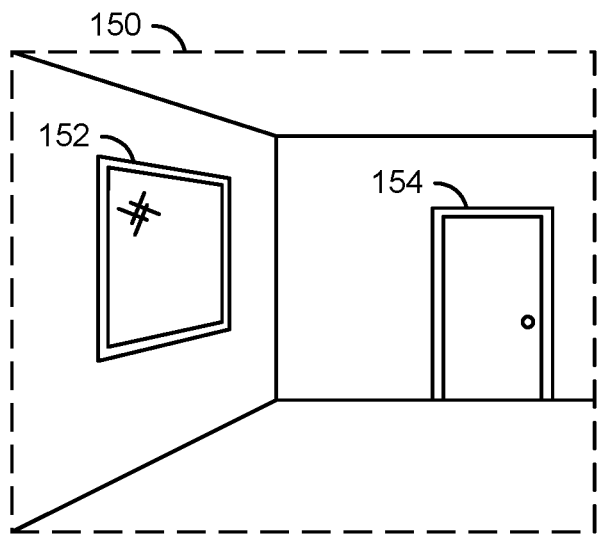
FIG. 4 is a diagram illustrating an example of ambient light in a room monitored by a camera in accordance with an example embodiment of the invention.

Referring to FIG. 4, a diagram of a video frame 150 is shown illustrating an example of a room monitored by a camera in accordance with an example embodiment of the invention. The video frame 150 may be an example video frame generated by the processor/SoC 102. The video frame 150 may be produced by the image capture device 104 in response to IR illumination. The video frame 150 may represent an environment captured by the camera 100. The video frame 150 generally shows a window 152 and a door 154. The window 152 and the door 154 may not be objects of interest. For example, if a motion sensor of the sensors 114 presented an indication of detected motion to the processor/Soc 102 via the signal SENS to initiate activation of the processor/SoC 102 in response to the window 152 and/or the door 154, the detection of motion by the sensors 114 would be considered a false alarm. In the example shown, the window 152 may also represent an area of the video frame 150 having a source of ambient visible light. In the example shown, the door 154 may represent an area of the video frame 150 having a low level of brightness.

In an example, the motion sensor of the sensors 114 may operate independently of the video frame 150 being captured by the image capture device 104 and/or the processor/SoC 102. For example, the motion sensor may operate when the image capture device 104 and/or the processor/SoC 102 are powered down. In another example, the motion sensor may be shut down when the image capture device 104 and/or the processor/SoC 102 are powered on to conserve an amount of power provided by the battery 120 and consumed by an operation of the sensors 114.

Figure 5:
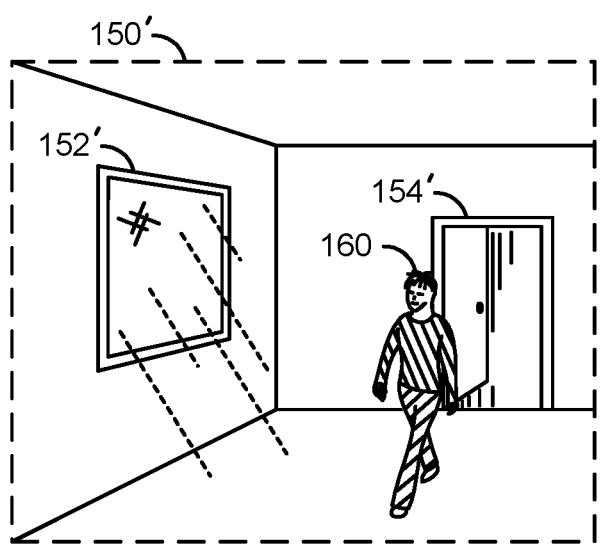
FIG. 5 is a diagram illustrating an object detected by video analytics in a video frame.

Referring to FIG. 5, a diagram is shown illustrating an example of an object detected by video analytics in a video frame. In an example, a video frame 150' may show a window 152', a door 154' and/or an object 160. The door 154' is shown open. The object 160 is shown as a person. The door 154' being opened and/or the presence of the object 160 in the frame 150' may result in the motion sensor of the sensors 114 being triggered. When the motion sensor is triggered, the infrared (IR) light source 110, the capture device 104, and the processor/SoC 102 may be activated to capture the video frame 150'. Upon identifying the object 160 being in the room using the IR illumination, the processor/SoC 102 may be configured to capture color information related to the object 160 based upon either ambient light (e.g., coming through the window 152') or by activating the visible light source 112. The video frame 150' may comprise a composite (e.g., fusion) of the IR image and the color information captured by RGB-IR image sensor 122 of the capture device 104. In an example, the video frame 150' may show colors (hatching) of a shirt and pants of the person 160, while the rest of the room remains rendered in black and white.

Figure 6:
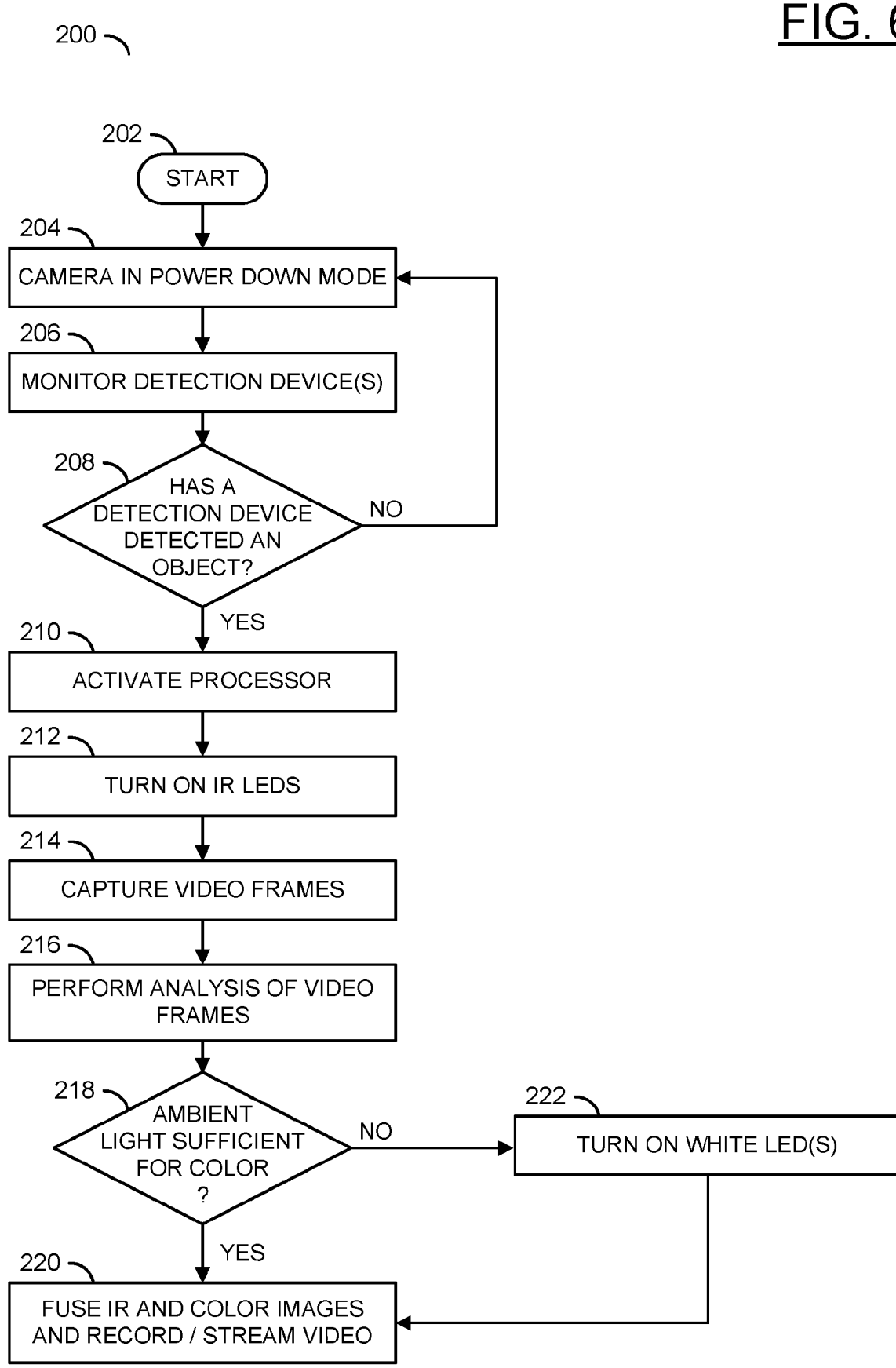
FIG. 6 is a diagram illustrating a process in accordance with an example embodiment of the invention.

Referring to FIG. 6, a flow diagram is shown illustrating a process 200 in accordance with an example embodiment of the invention. The process (or method) 200 may save battery life on a battery-powered IP camera. The method 200 generally comprises a step (or state) 202, a step (or state) 204, a step (or state) 206, a decision step (or state) 208, a step (or state) 210, a step (or state) 212, a step (or state) 214, a step (or state) 216, a decision step (or state) 218, a step (or state) 220, and a step (or state) 222. The state 202 may start the method 200. The method 200 may then move to the state 204.

In the state 204, the camera 100 may be in a power down mode (e.g., a sleep mode, a low power mode, etc.). In the state 206, the camera 100 may monitor the sensors 114. Next, in the decision state 208, the camera 100 may determine whether one or more of the sensors 114 has detected an object and/or movement (e.g., an object entering the field of view). If the sensors 114 have not detected an object and/or movement, the method 200 may return to the state 204. If sensors 114 have detected an object and/or movement, the method 200 may move to the state 210.

In the state 210, the sensors 114 may present the signal SENS to the processor/SoC 102, activating the processor/SoC 102. In the state 212, the processor/SoC 102 may turn on the IR LEDs 110 and the image capture device 104. In the state 214, the image capture device 104 may capture video frames and communicate the video frames to the processor/SoC 102 (e.g., via the signal VIDEO). In the state 216, the processor/SoC 102 may perform analysis of the video frames (e.g., local video analytics), and the method 200 may move to the decision state 218. In the decision state 218, the processor/SoC 102 may determine whether sufficient ambient light is present (e.g., via image analysis results, or information from an ambient light sensor communicated using the signal SENS) for capturing color information related to an object of interest detected in the video frames.

If sufficient ambient light is available, the method 200 may move to the state 220. If sufficient ambient light is not available, the method 200 may move to the state 222. In the state 222, the processor/SoC 102 may turn on the one or more of the visible light LEDs 112 to allow color information to be captured, then move to the state 220. In the state 220, the processor may fuse IR image data and color image data captured by the capture device 104, and record (e.g., via the memory 106) and/or stream (e.g., via the communications module 116) and/or present (e.g., via the signal VIDOUT) the fused (composite) images.

Figure 7:
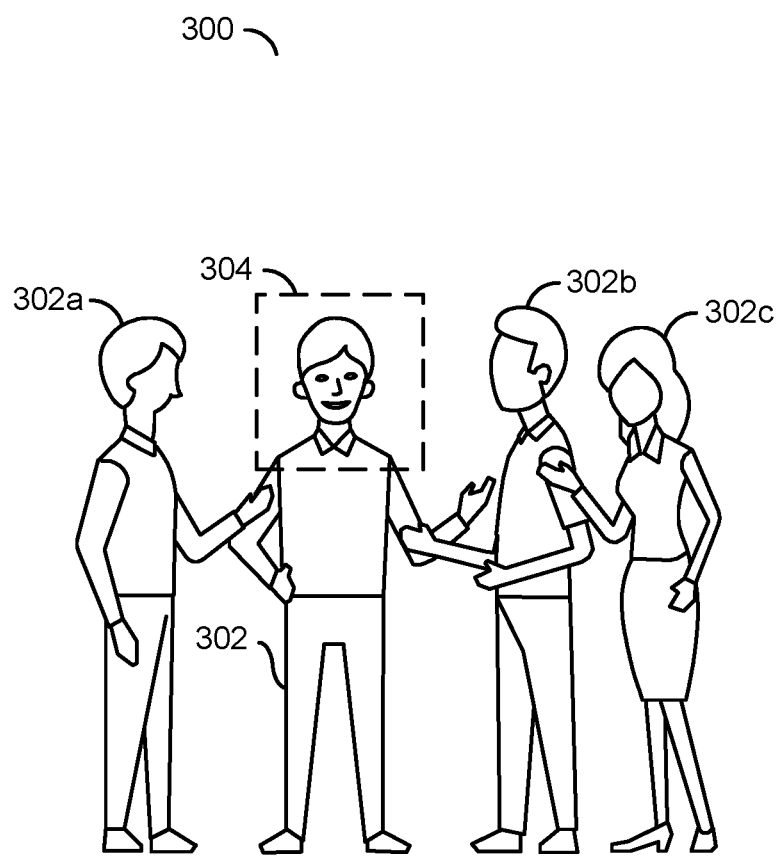
FIG. 7 is a diagram illustrating detecting an individual in an example video frame.

Referring to FIG. 7, a diagram illustrating detection of a target object in an example video frame 300 is shown. In an example, the video frame 300 may be a representative example of one of the video frames captured by one of the capture device 104 and communicated to the processor/SoC 102 via the signal VIDEO. The video frame 300 may visualize an area within a field of view captured by one or more of the cameras 100, 100', and 100" shown in FIG. 1. In an example, the video frame 300 may comprise one or more objects detected by the cameras 100, 100', and 100" (e.g., a person 302 and/or additional people 302*a*-302*c*). In an example, the person 302 may be identified (e.g., by a motion sensor, a proximity sensor, an audio sensor, etc.) as a target object. In an example, other example, the processor/Soc 102 may apply computer vision techniques (e.g., feature detection, object detection, etc.) to identify an area (or region) of interest (ROI) 304. The ROI 304 may be located around a face of the person 302. In another example, additional ROIs may be identified around the faces of the additional people 302*a*-302*c*.

Using information contained in the signal SENS from the sensors 114 (e.g., audio levels (or signals) from one or more directional microphones, location information from one or more proximity sensors, trigger signals from one or more PIR sensors, etc.), the processor/SoC 102 may determine a direction of the target person 302. The processor/SoC 102 may translate the directional information from the sensors 114 to a corresponding location in the video frames in the signal VIDEO. In an example, the area of interest 304 may be the location of the audio source translated to the video frame 300.

Once the direction of the target person 302 has been identified, the processor/SoC 102 may perform video analysis operations on the area of interest 304. In one example, the processor/SoC 102 may be configured to crop out the area 304 of the video image capturing the face of the target person 302. The processor/SoC 102 may then perform video operations to increase resolution and zoom in on the area of interest 304. In an example, the video operations may be configured to improve the results of facial recognition techniques applied by the processor/SoC 102. In an example, multiple faces may be captured. In the example shown, the faces of the people 302*a*-302*c* may be captured along with the face of the target person 302.

In the case where multiple faces are captured, the facial recognition implemented by the processor/SoC 102 may be further extended to identify whether one of the people is speaking. In an example, the processor/SoC 102 may determine that the target person 302 is speaking and the people 302*a*-302*c* are not speaking. In one example, the processor/SoC 102 may be configured to monitor mouth movements in the captured video frames. The mouth movements may be determined using the computer vision techniques. In some embodiments, the mouth movements may be combined (e.g., compared) with voice data being received. The processor/SoC 102 may decide which of the people 302*a*-302*c* and the target person 302 is speaking. For example, the processor/SoC 102 may determine which mouth movements align to the detected speech in the signal SENS.

The processor/SoC 102 may be configured to analyze the signal SENS to determine a location/direction (e.g., DIR) of an audio source. In some embodiments, the location/direction determined from the signal SENS may comprise a direction (e.g., a measurement in degrees from a center of the lens 108, a coordinate in a horizontal plane, etc.). In some embodiments, the location determined from the signal SENS may comprise multiple coordinates. For example, the location determined by the processor/SoC 102 may comprise a horizontal coordinate and a vertical coordinate from an optical axis of the lens 108. In another example, the location determined by the processor/SoC 102 may comprise a measurement of degrees (or radians) of a polar angle and an azimuth angle. In yet another example, the location determined may further comprise a depth coordinate. In the example shown, the location of the area of interest 304 may comprise at least a horizontal and vertical coordinate (e.g., the area of interest 304 is shown at face-level).

Figure 8:
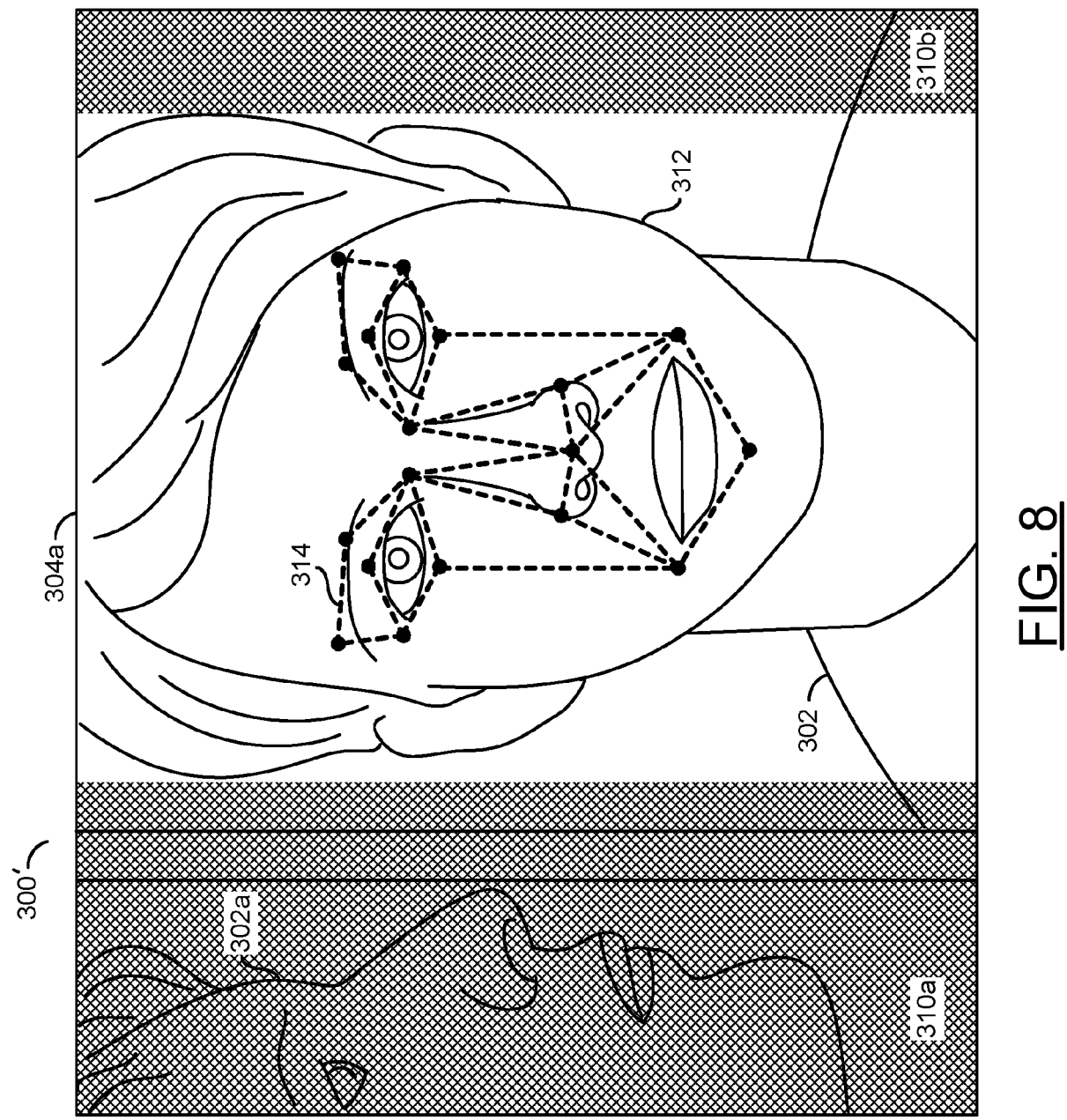
FIG. 8 is a diagram illustrating performing video operations on an example video frame.

Referring to FIG. 8, a diagram illustrating video operations on the video frame 300 is shown. The processor/SoC 102 may be configured to perform video operations on the video frame 300 and/or the area of interest 304. In the example shown, a portion 300' of example the video frame 300 may comprise a portion 304*a* of the area of interest 304 and two areas 310*a* and 310*b* adjacent to the portion 304*a*. Similarly, there may be adjacent areas (not shown) above and below the portion 304*a*.

One of the video operations performed by the processor/SoC 102 may be a cropping operation. The cropping operation may remove (e.g., delete, trim, etc.) one or more portions of the video frame 300. In an example, the cropping operation may remove all portions of the video frame 300 except for the portion 304*a* of the area of interest 304. In the example shown, the areas 310*a* and 310*b* may be the cropped portions of the video frame 300 (e.g., shown as shaded for illustrative purposes). In the example shown, the person 302 may be in the cropped area 304a. The cropping operation may remove the person 302a.

The face 312 of the target person 302 is shown within the portion 304a of the area of interest 304. The capture device 104 may implement a high-resolution image sensor. Using the high-resolution sensor, the processor/SoC 102 may combine over-sampling of the image sensor 122 with digital zooming within the cropped area 304a. The over-sampling and digital zooming may each be one of the video operations performed by the processor/SoC 102. The over-sampling and digital zooming may be implemented to deliver higher resolution images within the total size constraints of the cropped area 304a.

In some embodiments, the lens 108 may implement a fisheye lens. One of the video operations implemented by the processor/SoC 102 may be a dewarping operation. The processor/SoC 102 may be configured to dewarp the region of interest 304. The dewarping may be configured to reduce and/or remove acute distortion caused by the fisheye lens and/or other lens characteristics. For example, the dewarping may reduce and/or eliminate a bulging effect to provide a rectilinear image.

A higher resolution image of the window of interest 304 may be generated in response to the video operations performed by the processor/SoC 102. The higher resolution image may enable the facial recognition computer vision to work with greater precision. The processor/SoC 102 may be configured to implement the facial recognition computer vision. The facial recognition computer vision may be one of the video operations performed by the processor/SoC 102.

Facial recognition operations 314 are shown on the face 312 of the target person 302 in the portion of the area of interest 304a. The facial recognition operations 314 may be an illustrative example of various measurements and/or relationships between portions of the face 312 calculated by the processor/SoC 102. The facial recognition operations 314 may be used to identify the target person 302 as a specific (e.g., unique) individual and/or basic descriptive characteristics (e.g., tattoos, hair color, eye color, piercings, face shape, skin color, etc.). The facial recognition operations 314 may provide an output of the various measurements and/or relationships between the portions of the face 312. In some embodiments, the output of the facial recognition operations 314 may be used to compare against a database of known faces (e.g., for access control). The known faces may comprise various measurements and/or relationships between the portions of faces in a format compatible with the output of the facial recognition operations 314. In some embodiments, the output of the facial recognition operations 314 may be configured to provide descriptions of an intruder (e.g., for law enforcement).

Figure 9:
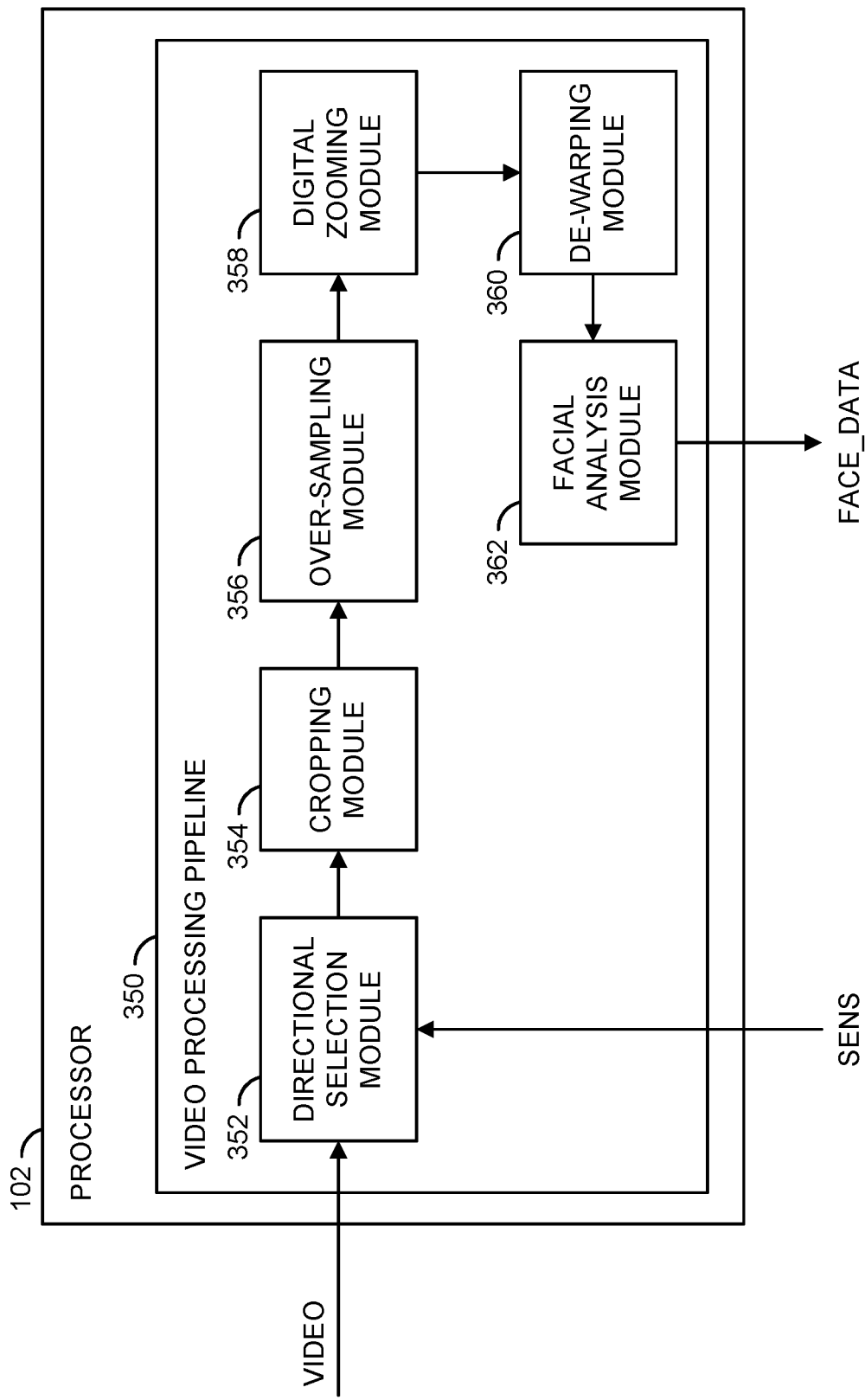
FIG. 9 is a block diagram illustrating an example video pipeline configured to perform video operations.

Referring to FIG. 9, a block diagram illustrating an example video pipeline configured to perform video operations is shown. The processor/SoC 102 may comprise a block (or circuit) 350. The circuit 350 may implement a video processing pipeline. The video processing pipeline may be configured to perform the various video operations implemented by the processor/SoC 102. The processor/SoC 102 may comprise other components (not shown). The number, type and/or arrangement of the components of the processor/SoC 102 may be varied according to the design criteria of a particular implementation.

The video processing pipeline 350 may be configured to receive an input signal (e.g., VIDEO) and/or an input signal (e.g., the signal SENS). The video processing pipeline may be configured to present an output signal (e.g., FACE_-DATA). The video processing pipeline 350 may be configured to receive and/or generate other additional signals (not shown). The number, type and/or function of the signals received and/or generated by the video processing pipeline may be varied according to the design criteria of a particular implementation.

The video pipeline 350 may be configured to encode video frames captured by the capture device 104. In various embodiments, the video pipeline 350 may be configured to perform image fusion between IR image data and color image data generated from frames of the signal VIDEO. The video pipeline 350 may be configured to perform dewarping, cropping, enhancements, rolling shutter corrections, stabilizing, downscaling, packetizing, compression, conversion, blending, synchronizing and/or other video operations. The architecture of the video pipeline 350 may enable the video operations to be performed on high resolution video and/or high bitrate video data in real-time and/or near real-time. The video pipeline module 350 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 350 may enable 4K ultra high resolution with H.264 encoding at double real time speed (e.g., 60 fps), 4K ultra high resolution with H.265/HEVC at 30 fps and/or 4K AVC encoding. The type of video operations and/or the type of video data operated on by the video pipeline 350 may be varied according to the design criteria of a particular implementation.

In an example, the video processing pipeline 350 may comprise a block (or circuit) 352, a block (or circuit) 354, a block (or circuit) 356, a block (or circuit) 358, a block (or circuit) 360 and/or a block (or circuit) 362. The circuit 352 may implement a directional selection module. The circuit 354 may implement a cropping module. The circuit 356 may implement an over-sampling module. The circuit 358 may implement a digital zooming module. The circuit 360 may implement a dewarping module. The circuit 362 may implement a facial analysis module. The video processing pipeline 350 may comprise other components (not shown). The number, type, function and/or arrangement of the components of the video processing pipeline 350 may be varied according to the design criteria of a particular implementation.

The circuits 352-362 may be conceptual blocks representing the video operations performed by the processor/SoC 102. In an example, the circuits 352-362 may share various resources and/or components. In an example, the resources and/or components may be implemented using dedicated hardware circuits configured to minimize power consumption while providing a desired level of performance. The order of the circuits 352-362 may be varied and/or may be changed in real-time (e.g., video data being processed through the video processing pipeline may not necessarily move from the circuit 352, to the circuit 354, then to the circuit 356, etc.). In some embodiments, one or more of the circuits 352-362 may operate in parallel.

The directional selection module 352 may be configured to receive the signal VIDEO (e.g., one or more video frames) from the capture device 104. The directional selection module 352 may be configured to receive signal SENS (or a component of the signal SENS) from the sensors 114. The directional selection module 352 may be configured to extract the location/direction of an audio source based on audio signal contained in the signal SENS. The directional selection module 352 may be configured to translate the information in the signal SENS to a location (e.g., coordinates, distance, etc) of an object in the input video frames (e.g., the signal VIDEO). Based on the extracted location, the directional selection module 352 may select the area of interest 304. In an example, the area of interest 304 may be identified using Cartesian coordinates (e.g., an X, Y, and Z coordinate) and/or spherical polar coordinates (e.g., a radial distance, a polar angle and an azimuth angle). The format of the selected area of interest 304 generated by the direction selection module 352 may be varied according to the design criteria of a particular implementation.

The cropping module 354 may be configured to crop (e.g., trim) the region of interest 304 from the full video frame 300 (e.g., generate the region of interest frame). The cropping module 354 may receive the signal VIDEO and the selected area of interest information from the directional selection module 354. The cropping module 354 may use the coordinates of the area of interest to determine the portion of the video frame to crop. The cropped region may be the area of interest 304 or a portion 304a of the area of interest 304.

In an example, cropping the region of interest 304 may generate a second image. The cropped image (e.g., the region of interest video frame 304) may be smaller than the original video frame 300 (e.g., the cropped image may be a portion of the captured video). The area of interest 304 may be dynamically adjusted based on the location of the object determined by the directional selection module 352. For example, the detected object may be moving, and the location of the detected object may move as the video frames are captured. The directional selection module 352 may update the selected region of interest coordinates and the cropping module 354 may dynamically update the cropped section 304). The cropped section may correspond to the area of interest selected. As the area of interest changes, the cropped portion 304a may change. For example, the selected coordinates for the area of interest 304 may change from frame to frame, and the cropping module 354 may be configured to crop the selected region 304 in each frame. For each frame captured by the capture device 104, the cropping module 354 may be configured to crop different coordinates, based on the location information determined from the signal SENS.

The over-sampling module 356 may be configured to over-sample the image sensor 122. The over-sampling of the image sensor 122 may result in a higher resolution image. The higher resolution images generated by the over-sampling module 356 may be within total size constraints of the cropped region.

The digital zooming module 358 may be configured to digitally zoom into an area of a video frame. The digital zooming module 358 may digitally zoom into the cropped area of interest 304. For example, the directional selection module 352 may establish the area of interest 304 based on the signal SENS, the cropping module 354 may crop the area of interest 304, and then the digital zooming module 358 may digitally zoom into the cropped region of interest 304a of the video frame 300. In some embodiments, the amount of zooming performed by the digital zooming module 358 may be a user selected option.

The dewarping operations performed by the hardware dewarping module 360 may adjust the visual content of the video data. The adjustments performed by the dewarping module 360 may cause the visual content to appear natural (e.g., appear as seen by a person viewing the location corresponding to the field of view of the capture device 104). In an example, the dewarping module 360 may alter the video data to generate a rectilinear video frame (e.g., correct artifacts caused by the lens characteristics of the lens 108). The dewarping operations performed by the hardware dewarping module 360 may be implemented to correct the distortion caused by the lens 108. The adjusted visual content may be presented by the dewarping module 360 to enable more accurate and/or reliable facial detection.

Implementing the dewarping module 360 as a hardware module may increase the video processing speed of the processor/SoC 102. The hardware implementation of the dewarping module 360 may dewarp the area of interest 304 faster than a software implementation. The hardware implementation of the dewarping module 360 may enable the video to be processed while reducing an amount of delay. For example, with the hardware implementation, the audio detected may be associated with the location of the audio source in near real-time (e.g., low lag). The hardware implementation of the dewarping module 360 may implement the various calculations used to dewarp the area of interest 304 using hardware components. The hardware components used may be varied according to the design criteria of a particular implementation.

The facial analysis module 362 may be configured to perform the facial analysis operations 314. For example, the facial analysis module 362 may be configured to perform the measurements and/or comparisons of the facial features of the face 312 of the target person 80 in the selected window of interest 304a. Generally, the video operations performed by the circuits 352-360 may be implemented to facilitate an accurate and/or reliable detection of the facial features 314. For example, a high-resolution and dewarped area of interest 304 may reduce potential errors compared to a video frame that has warping present and/or a low resolution video frame. Cropping the input video frames to the area of interest 304a may reduce an amount of time and/or processing to perform the facial detection compared to performing the facial detection operations on a full video frame.

The facial analysis module 362 may be configured to generate the signal FACE_DATA. The signal FACE_DATA may comprise the facial information extracted from the area of interest 304 using the facial analysis operations 224. The data in the extracted information FACE_DATA may be compared against a database of facial information to find a match for the identity of the target person 302. In some embodiments, the facial analysis module 362 may be configured to perform the comparisons of the detected facial information with the stored facial information in the database. Comparing the detected facial information with the stored facial information in the database may facilitate access control based on biometric measurement instead of using a code entered by keypad or touch pad.

In some embodiments, the components 352-362 of the video processing pipeline 350 may be implemented as discrete hardware modules. In some embodiments, the components 352-362 of the video processing pipeline 350 may be implemented as one or more shared hardware modules. In some embodiments, the components 352-362 of the video processing pipeline 350 may be implemented as software functions performed by the processor/SoC 102.

Figure 10:
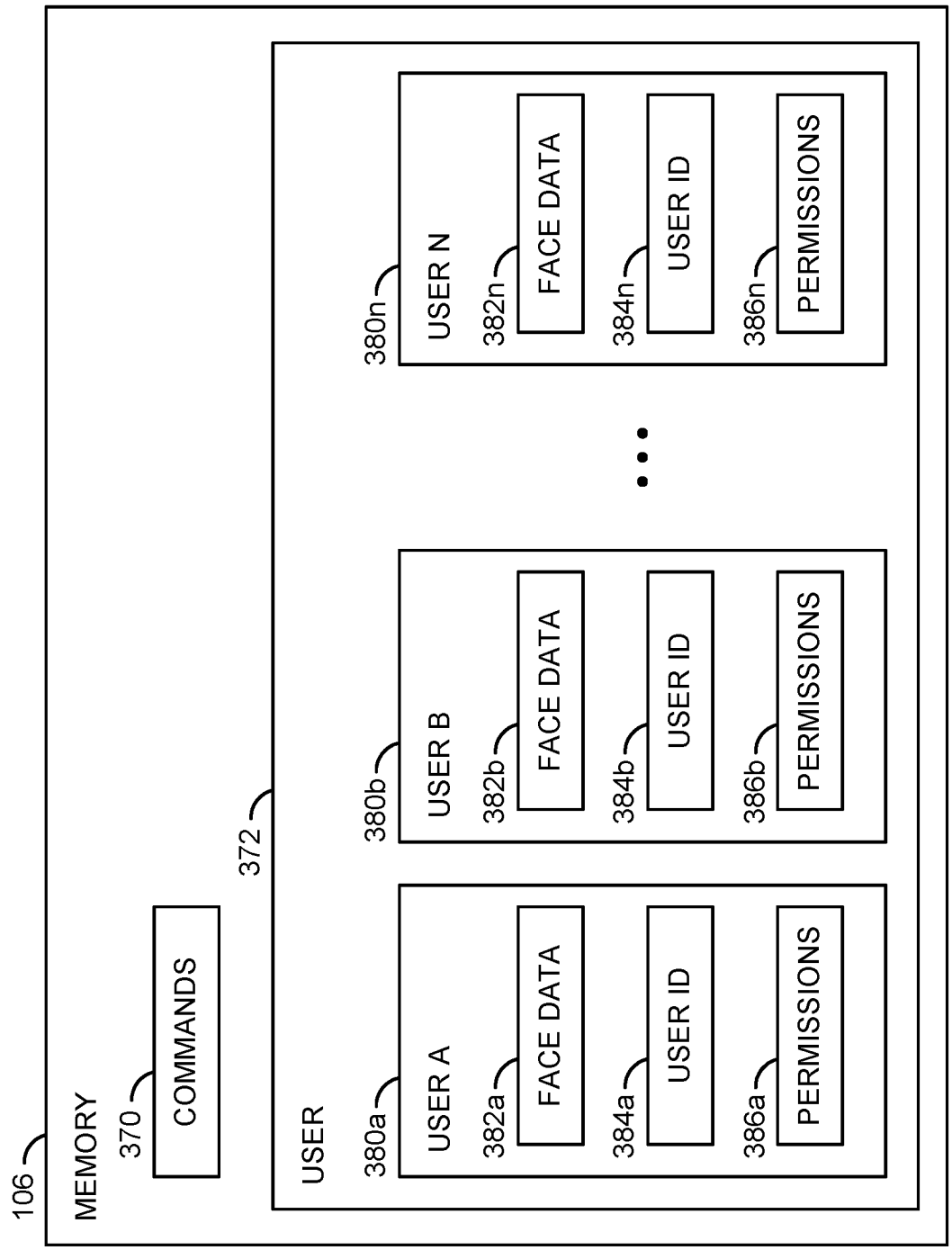
FIG. 10 is a diagram illustrating user profiles stored in a memory.

Referring to FIG. 10, a diagram illustrating user profiles stored in a memory is shown. In some embodiments, the database of facial information and/or the permissions may be stored locally on the camera 100 (e.g., in the memory 118). In some embodiments, the facial information and/or the permissions may be stored remotely (e.g., in a remote storage such as a cloud database) and the camera 100 may access the information using the communication device 116. The method of accessing the facial information and/or permissions may be varied according to the design criteria of a particular implementation.

In an example, the memory 118 may comprise a block (or circuit) 370 and/or a block (or circuit) 372. The circuit 370 may implement a commands storage. The circuit 372 may implement a user storage. The user storage 372 may comprise a block (or circuit) 380a-380n. The circuits 380a-380n may each implement a user profile. The user profiles 380a-380n may each comprise respective blocks (or circuits) 382a-382n, respective blocks (or circuits) 384a-384n and/or respective blocks (or circuits) 386a-386n. Each of the circuits 382a-382n may implement facial data storage for a respective one of the user profiles 380a-380n. Each of the circuits 384a-384n may implement user ID storage for a respective one of the user profiles 380a-380n. Each of the circuits 386a-386n may implement permissions storage for a respective one of the user profiles 380a-380n. The memory 118, the user storage 372 and/or the user profiles 380a-380n may each comprise other components (not shown). The number, type and/or arrangement of the components of the memory 118, the user storage 372 and/or the user profiles 380a-380n may be varied according to the design criteria of a particular implementation.

The commands 370 may store the various features that may be performed by the apparatus 100. The commands 370 may store an association between audio (e.g., speech) data and the various features. For example, the processor/SoC 102 may receive an audio command, extract the command from the voice data (e.g., by matching the speech patterns received with the stored speech patterns for the commands), determine the features and/or functions associated with the command received and, if the speaker has permissions, perform the features and/or functions. In some embodiments, the matching of speech patterns may be performed using cloud processing (e.g., the audio command may be uploaded to a cloud processing service using the communication device 116, the cloud processing service may determine the command and provide the instructions to the processor/SoC 102).

The user storage 372 may store the user profiles 380a-380n for each user that has permission to use the camera 100. In one example, each user may register an account to use the camera 100 (e.g., the camera 100 may provide an API to enable users to create accounts, for example, using a web browser to access the camera 100). The method of creating a new user account may be varied according to the design criteria of a particular implementation.

Each of the user profiles 380a-380n may comprise a respective one of the face data storage 382a-382n. The face data storage 382a-382n may comprise a database of stored facial information about each of the users. The facial information stored in the face data 382a-382n may be accessed by the processor/SoC 102 to perform comparisons against the detected facial information FACE_DATA. The face data 382a-382n may enable the processor/SoC 102 to match the detected audio with one of the user profiles 380a-380n. In an example, if no match is found (e.g., the detected facial data FACE_DATA does not match any of the stored face data 382a-382n) then the command may be ignored. In another example, if a match is found (e.g., the detected facial data FACE_DATA does match one of the stored face data 382a-382n) then the processor/SoC 102 may check whether the user has permission to access the features and/or functions of the command provided.

Each of the user profiles 380a-380n may comprise a respective one of the user ID storage 384a-384n. The user ID storage 384a-384n may comprise general account information for the user profiles 380a-380n. In an example, the user ID storage 384a-384n may store login and/or authentication information (e.g., name, username, password, etc.). In another example, the user ID storage 384a-384n may comprise a history of commands provided. In still another example, the user ID storage 384a-384n may comprise preferences of the user that may be associated with relevant advertisements for the user. The type of information stored by the user ID storage 384a-384n may be varied according to the design criteria of a particular implementation.

Each of the user profiles 380a-380n may comprise a respective one of the permissions storage 386a-386n. The permissions 386a-386n may comprise data indicating which features and/or functions of the apparatus 100 each user is allowed to access. In some embodiments, the permissions 386a-386n may be associated with the commands 370. In one example, the permissions 386a-386n may comprise a string of binary bits formatted to correspond to the commands 370 (e.g., to provide an 'on' or 'off' for each command). In another example, the permissions 386a-386n may comprise a read, write or execute indicator associated with the commands 370. If the user profile 380a-380n associated with the detected person 302 does not have permission for the command provided, then the apparatus associated with the camera 100 may deny access to the location, feature and/or function. If the user profile 380a-380n associated with the detected person 302 does have permission for the command provided, then the apparatus associated with the camera 100 may enter the location and/or initiate the feature and/or function.

Once the face 312 of the person 302 has been captured the camera 100 may then check the captured face data (e.g., the signal FACE_DATA) against the existing database of faces 382a-382n to determine the identity of the person 302. The permissions 386a-386n associated with the matching one of the faces 382a-382n may define the rights and privileges to which the person 302 has access. In one example, the rights and privileges defined by the permissions 386a-386n may cover being able to enable or disable certain camera features. In another example, the rights and privileges defined by the permissions 386a-386n may cover whether the person 302 is allowed to enter a secure area, make on-line transactions and/or purchases, etc. The number, type and/or format of the permissions 386a-386n may be varied according to the design criteria of a particular implementation.

Figure 11:
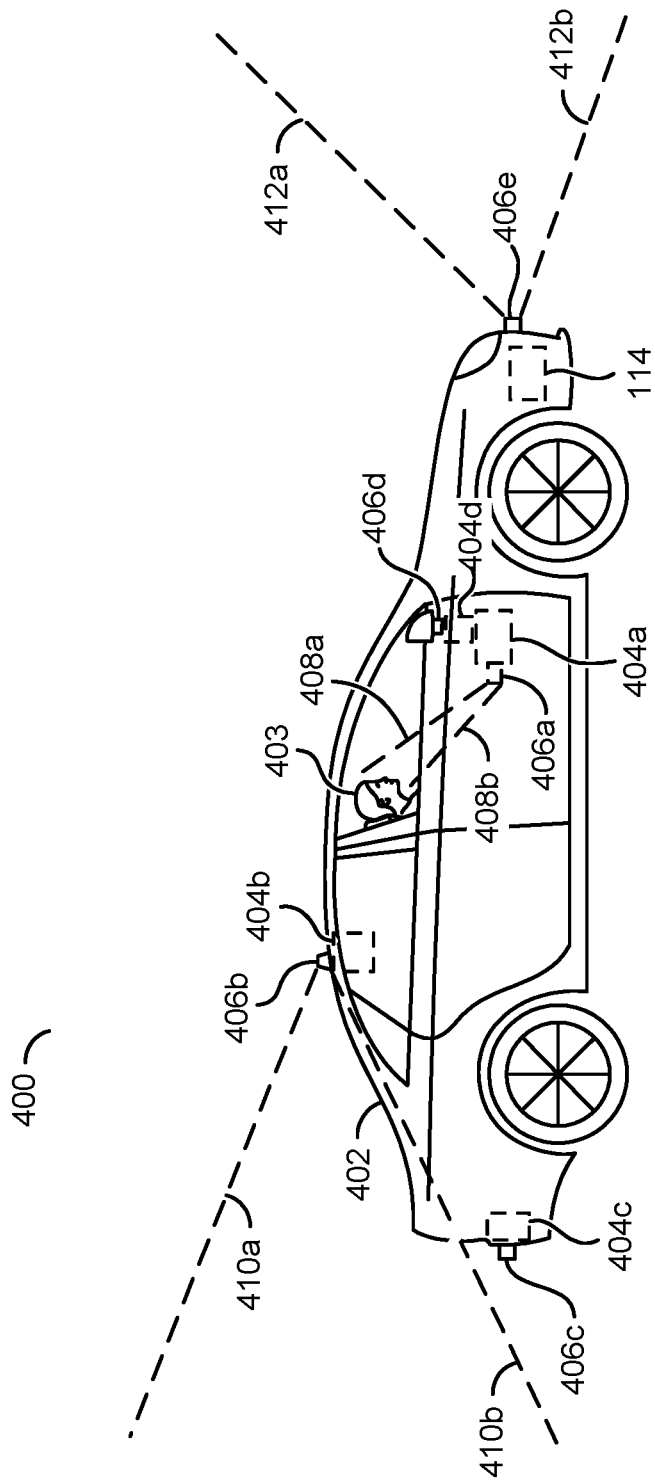
FIG. 11 is a diagram illustrating an example of camera systems inside and outside of a vehicle.

Referring to FIG. 11, a diagram illustrating an example embodiment 400 of camera systems inside and outside of a vehicle is shown. An automobile/vehicle 402 is shown having a number of cameras. In various embodiments, the cameras may include interior driver and/or cabin monitoring cameras, external short range exterior cameras for applications including around vehicle monitoring (AVM) and automatic parking assistance, and rear view cameras. In some embodiments, the vehicle 402 may be a truck, an ATV, an airplane, a drone, etc. The type of the vehicle 402 may be varied according to the design criteria of a particular implementation. A driver 403 is shown seated in the vehicle 402. Vehicle sensors of the vehicle 402 may be configured as the sensors 114 of FIG. 2.

In an example, the vehicle 402 may include an interior camera (e.g., a capture device 404a and a lens 406a), a first rear view camera (e.g., a capture device 404b and a lens 406b), a second rear view camera (e.g., a capture device 404c and a lens 406c), a side mirror camera (e.g., a capture device 404d and a lens 406d), and a front view camera (e.g., a capture device 404e and a lens 406e). The cameras may be implemented similarly to the camera 100. In an example, each of the cameras of the vehicle 402 may comprise a processor/Soc 102. In another example, a single instance of the processor/SoC 102 may be configured to receive video and sensor data from all of the cameras of the vehicle 402.

In an example, the interior camera (e.g., the capture device 404a and the lens 406a) is shown capturing a view of the interior of the vehicle 402 (e.g., detecting the driver 403). A targeted view of the driver 403 (e.g., represented by a line 408a and a line 408b) is shown being captured by the capture device 404a. The capture device 404a may also detect other objects in the vehicle 402 (e.g., a seat, a head rest, an arm rest, a rear window, a seatbelt, a center console, other occupants, etc.). By analyzing video of the driver 403 and/or other contents of the vehicle 402 (e.g., extracting video data from the captured video), the processor/SoC of the interior camera may determine an identity, a body position, and/or body characteristics (e.g., a distance, orientation and/or location of the body and/or head) of the driver 403 and/or one or more occupants and/or objects within the vehicle 402.

In an example, the first rear view camera (e.g., the capture device 404b and the lens 406b) is shown capturing a targeted view from the vehicle 402. In the example shown, the targeted view from the vehicle 402 (e.g., represented by a line 410a and a line 410b) is shown capturing an exterior view to the rear of (e.g., an area behind) the vehicle 402. Similarly, the other cameras may be used to capture video data of a targeted view from the vehicle. For example, the forward view camera (e.g., a capture device 404e and a lens 406e) may provide a front exterior view of an area (e.g., represented by a line 412a and a line 412b). The number of cameras implemented, a direction captured, an orientation of the cameras and/or an arrangement of the cameras may be varied according to the design criteria of a particular implementation.

The capture devices 404a-404e may be configured to capture video data of the environment in and around the vehicle 402. The processors/SoCs associated with the capture devices 404a-404e may implement computer vision to detect objects and/or understand what is happening near the vehicle 402 (e.g., see the environment as a human driver would see the environment). The sensors 114 may be implemented using proximity detection technology. For example, the vehicle sensors 114 may implement a radar device, an array of radars, a sonar device, an array of sonars, a LIDAR device, an array of LIDAR devices, an ultra-sound device, an array of ultra-sound devices, etc. The capture devices 404a-404e may be implemented with RGB-IR image sensors. The processors/SoCs associated with the capture devices 404a-404e may implement an IR and color image data fusion technique in accordance with an embodiment of the invention. In an example, the processors/SoCs associated with the capture devices 404a-404e may be configured to add the color of near by signs, curbs, and/or occupants of the vehicle 402 to IR images taken in low light situations.

Figure 12:
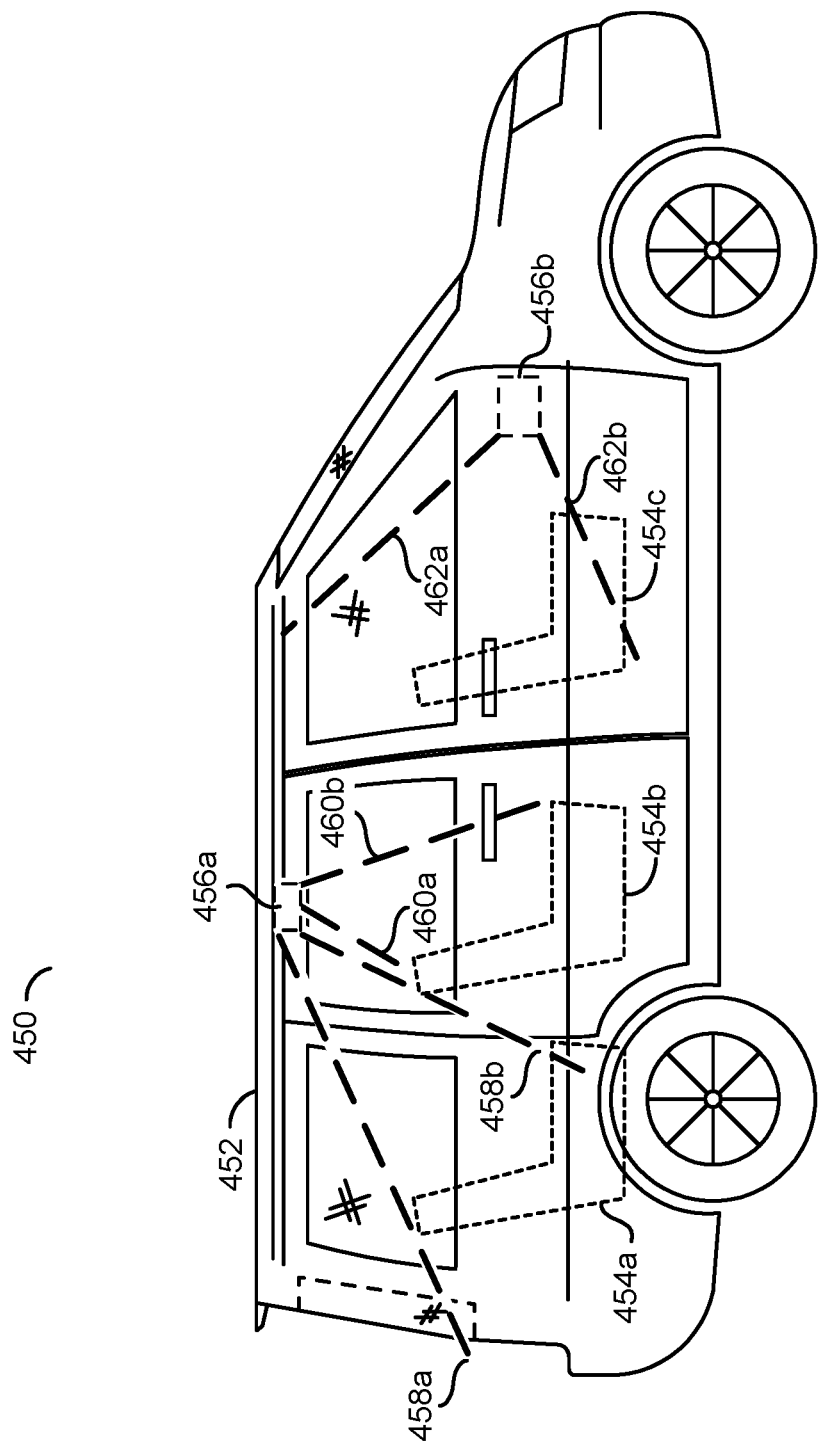
FIG. 12 is a diagram illustrating an example of interior camera systems configured to monitor vehicle occupants.

Referring to FIG. 12, a diagram illustrating an example 450 of interior camera systems configured to monitor a cabin and occupants of a vehicle is shown. Various camera angles of an interior of a vehicle 452 are shown. In an example, the vehicle 452 may have multiple rows of seats 454a-454c. Each of the rows of seats 454a-454c may be monitored to detect and/or classify one or more occupants or objects within the vehicle 452. In an example, cameras (e.g., 456a and 456b) may be place in the vehicle 452. The cameras 456a and 456b may be implemented similarly to the camera 100 described above. In various embodiments, the cameras 456a and 456b may comprise RGB-IR image sensors and a processor/SoC similar to the processor/SoC 102 described above. The RGB-IR image sensors and processor/SoCs may allow the cameras 456a and 456b to capture images with portions in color in low light conditions. The fusion of IR images and color information obtained from RGB-IR video signals may allow improved identification of occupants of the vehicle and/or identification of objects in the vehicle that are need easily discernable with IR only images. The cameras 456a and 456b may include both IR LEDs and visible (white) light LEDs. In an example, the visible light LEDs may be configured to provide a small amount of visible light enabling the processor/SoCs in the cameras 456a and 456b to extract color information from RGB-IR video signals without negatively affecting operation of the vehicle 452 in low light environments. In another example, the ambient light from outside the vehicle 452 may also be used to enable the processor/SoCs in the cameras 456a and 456b to extract color information from RGB-IR video signals without negatively affecting operation of the vehicle 452 in low light environments.

The camera 456a is shown mounted on a ceiling of the vehicle 452. The camera 456a is shown having a viewing angle or field of view (e.g., represented by lines 458a and 458b) that points toward the back row of seats 454a. The camera 456a may also have a field of view (e.g., represented by lines 460a and 460b) to capture the middle row of seats 454b. In another example, the camera 456a may implement a wide angle lens to capture both rows of seats 454a and 454b.

Similarly, the camera 456b may capture an interior of the front row of seats 454c of the vehicle 452. A field of view (e.g., represented by lines 462a and 462b) of the camera 456b may capture the front row of seats 454c. The multiple fields of view captured by the cameras 456a and 456b may be a targeted wide angle view of the interior of the vehicle 452. The number of cameras, number of angles, and/or number of fields of view may be varied according to the design criteria of a particular implementation.

Based on the detected objects, the processors/SoCs of the cameras 456a and 456b may determine a position (e.g., a distance) of the objects relative to the vehicle 452 and/or a position of the objects relative to a component of the vehicle 452 (e.g., distance from a vehicle pillar, distance from a steering wheel, distance from a dashboard, distance from another seat, etc.). Depending on the distance of the detected objects from the cameras 456a and 456b, the processors/SoCs of the cameras 456a and 456b may turn on a visible light source (e.g., white LED) to enable color information to be extracted from RGB-IR video signals generated by image sensors within the cameras 456a and 456b.

In some embodiments, video analytics may be applied by the processors/SoCs to the captured video frames for biometric markers to determine identity and/or vulnerability of the occupants of the vehicle 452. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data may be processed in video pipeline to generate inferences about body characteristics to determine age, gender, and/or condition (e.g., wrinkles, facial structure, bloodshot eyes, eyelids, signs of exhaustion, etc.). The addition of color information to IR images may improve reliability of facial recognition routines executed by the processors/SoCs associated with each camera 456a and 456b.

The processors/SoCs associated with each camera 456a and 456b may be configured to detect faces in a region of a video frame. In some embodiments, facial recognition may be implemented (e.g., based on faces stored as references in the memory 118 and/or an external database accessible by the communication devices 116). In some embodiments, the processors/SoCs associated with each camera 456a and 456b may be configured to detect objects and classify the objects as a particular type of object (e.g., an elderly person, a child, an animal, etc.).

In an example, processors/SoCs associated with the cameras 456a and 456b may implement sensor fusion technique that may be used to combine information from the sensors 114 to adjust a confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle, combining detection of an RFID key fob with facial recognition for improved access control, etc.).

Figure 13:
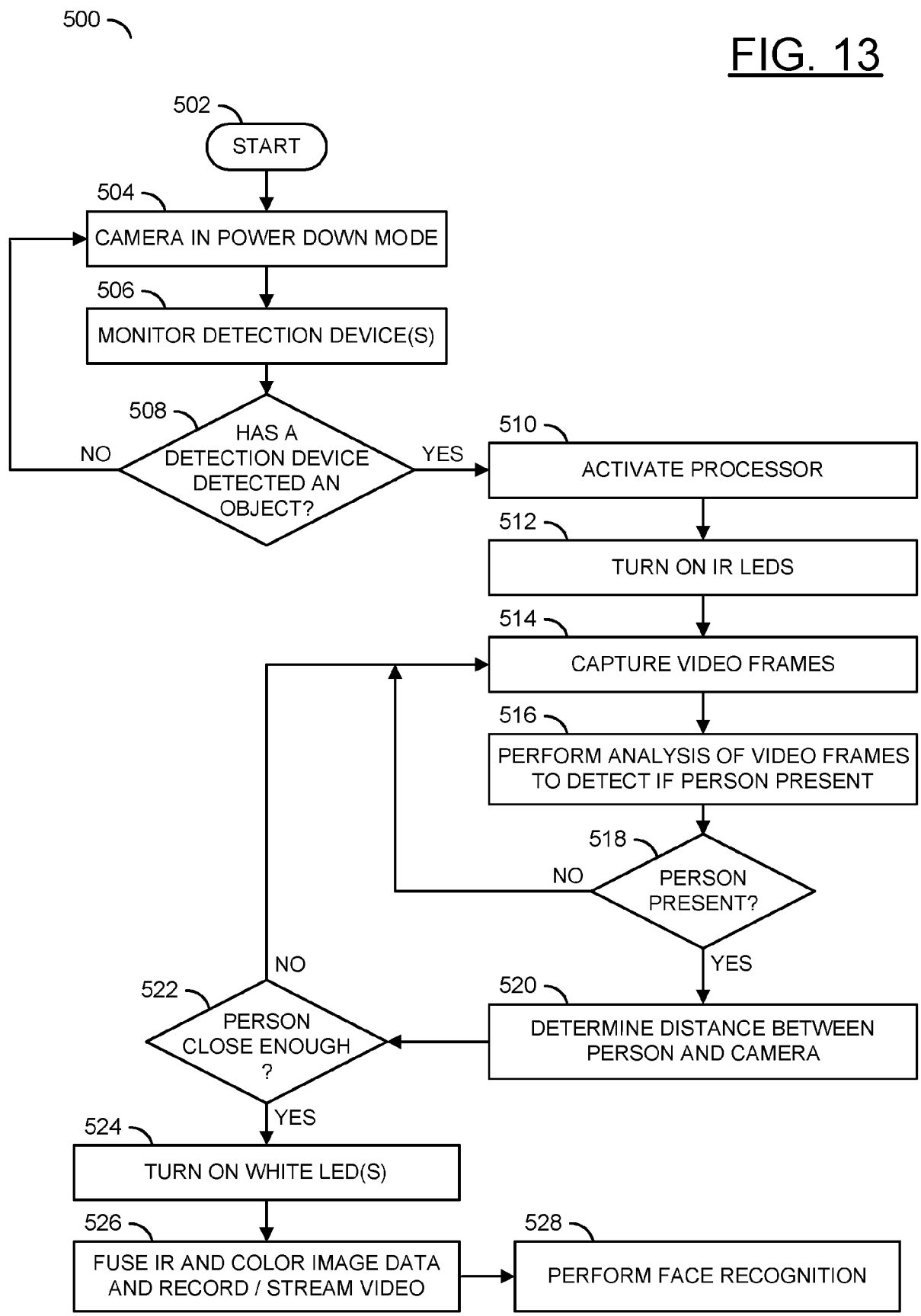
FIG. 13 is a diagram illustrating an access control process in accordance with an example embodiment of the invention.

Referring to FIG. 13, a flow diagram is shown illustrating a process 500 in accordance with an example embodiment of the invention. The process (or method) 500 may save battery life on a battery-powered IP camera. The method 500 generally comprises a step (or state) 502, a step (or state) 504, a step (or state) 506, a decision step (or state) 508, a step (or state) 510, a step (or state) 512, a step (or state) 514, a step (or state) 516, a decision step (or state) 518, a step (or state) 520, a decision step (or state) 522, a step (or state) 524, a step (or state) 526, and a step (or state) 528. The state 502 may start the method 500. The method 500 may then move to the state 504.

In the state 504, the camera 100 may be placed in a power down mode (e.g., a sleep mode, a low power mode, etc.). In the states 506 and 508, the camera 100 may monitor the sensors 114 to detect an object. The method 500 may move from the state 506 to the decision state 508 when one or more of the sensors 114 are triggered. In the decision state 508, the camera 100 may determine whether one or more of the sensors 114 has detected an object and/or movement (e.g., an object entering the field of view). If the sensors 114 have not detected an object and/or movement, the method 500 may return to the state 504. If sensors 114 have detected an object and/or movement, the method 500 may move to the state 510.

In the state 510, the processor/SoC 102 may be activated. The processor/SoC 102 may be configured to analyze the signal SENS from the sensors 114 upon being activated. In the state 512, the processor/SoC 102 may turn on the IR LEDs 110 and the image capture device 104. In the state 514, the image capture device 104 may capture video frames and communicate the video frames to the processor/SoC 102 (e.g., via the signal VIDEO). In the state 516, the processor/SoC 102 may apply person detection operations to the black and white video captured while the camera 100 is utilizing IR illumination. In an example, the processor/SoC 102 may utilize computer vision techniques such as feature extraction, object detection, object identification, etc. In an example, the processor/SoC 102 may utilize a neural network (e.g., a convolutional neural network (CNN), a deep learning neural network, etc.) trained to separate people from other objects. In the state 518, the processor/SoC 102 may determine whether a person is present in the field of view of the camera 100.

When the processor/SoC 102 determines that a person is present, the method 500 may move to the state 520. If the processor/SoC 102 determines that a person is not present, the method 500 may return to the state 514. In the state 520, the processor/SoC 102 may analyze the video frames (e.g., local video analytics) and/or query the sensors 114 to determine a distance of the person from the camera 100, and the method 500 may move to the decision state 522. In the decision state 522, the processor/SoC 102 may determine whether the person is close enough to the camera 100 to be illuminated by the white LED 112 in order to capture color information from the video frames.

If the distance between the person and the camera 100 will allow illumination of the person by the white LED 112, the method 500 may move to the state 524. If the distance between the person and the camera 100 will not allow illumination of the person by the white LED 112, the method 500 may return to the state 514. In the state 524, the processor/SoC 102 may turn on one or more of the visible light LEDs 112 to allow color information to be extracted from the captured video frames, and moves to the state 526. The visible light LEDs 112 may also be switched on to illuminate a keypad or other device that may be used by the person to obtain clearance for access. In the state 526, the processor/SoC 102 may fuse the IR image data and the color image data captured by the capture device 104 to generate a full color facial image. The processor/SoC 102 may record (e.g., via the memory 106) and/or stream (e.g., via the communications module 116) and/or present (e.g., via the signal VIDOUT) the fused (composite) images. In the state 528, the processor/SoC 102 may also utilize the full color facial image to run face recognition procedures with improved accuracy compared to the black and white images generated by the IR illumination. In an example, the improved face recognition and/or input from the entry device (e.g., keypad, touch pad, etc.) may provide more robust security.

The functions and structures illustrated in the diagrams of FIGS. 1 to 13 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, non-volatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a first light source capable of emitting infrared light to illuminate a scene;
a second light source capable of emitting visible light to illuminate said scene;
an RGB-IR image sensor circuit comprising an RGB-IR image sensor responsive to both infrared and visible light, and configured to generate video surveillance data of said scene comprising both infrared information and color information, wherein said RGB-IR image sensor being responsive to said infrared light emitted by said first light source reduces an amount of visible light illumination needed to obtain said color information; and
a processing circuit coupled to said first light source, said second light source, and said RGB-IR image sensor circuit, wherein (a) said processing circuit includes a video processing pipeline comprising a directional selection circuit and (b) said processing circuit is configured to (i) automatically control said first light source, said second light source, and said RGB-IR image sensor circuit, (ii) process said video surveillance data arranged as video frames, (iii) generate a composite image comprising both the infrared information and the color information contained in said video surveillance data received from said RGB-IR image sensor circuit, (iv) utilize said directional selection circuit of said video processing pipeline to analyze signals comprising at least audio signals generated from sounds picked up in a field of view monitored by the RGB-IR image sensor by one or more sensors coupled to said processing circuit to determine directional information of an object in the field of view of said RGB-IR image sensor, (v) utilize said directional information to identify a corresponding location of an area of interest in said video frames, and (vi) apply a person detection operation to said infrared information in said area of interest utilizing a neural network trained to separate people from other objects to identify a source of the sounds.

2. The apparatus according to claim 1, wherein said processing circuit is further configured to control turn on of said first light source and said second light source.

3. The apparatus according to claim 1, wherein:
said first light source comprises one or more infrared light emitting diodes (LEDs); and
said second light source comprises one or more white light LEDs.

4. The apparatus according to claim 1, wherein said apparatus is configured as at least one of a doorbell camera, an exterior security camera, and an interior security camera.

5. The apparatus according to claim 1, wherein said apparatus is configured as one or more of an interior monitoring camera configured to monitor a vehicle passenger compartment, an external short range camera configured to provide around vehicle monitoring, an automatic parking assistance camera, and a rear view camera.

6. The apparatus according to claim 1, wherein said processing circuit comprises a camera system on chip.

7. The apparatus according to claim 1, further comprising a motion detection circuit coupled to said processing circuit and configured to activate said processing circuit in response to detecting motion in a predefined field of view.

8. The apparatus according to claim 7, wherein said motion detection circuit comprises a passive infrared (PIR) sensor.

9. The apparatus according to claim 1, wherein said apparatus is configured as a battery-powered camera.

10. The apparatus according to claim 1, wherein said processing circuit is configured to perform a sensor fusion operation utilizing infrared image data and said color information captured using said RGB-IR image sensor.

11. The apparatus according to claim 1, wherein said video processing pipeline of said processing circuit further comprises a facial analysis module configured to determine whether a face detected in said area of interest is a person matching one of a plurality of user profiles stored in a database of known faces.

12. The apparatus according to claim 11, wherein said processing circuit is further configured to determine a distance between said object and said RGB-IR image sensor by applying one or more image processing operations on said video surveillance data from said RGB-IR image sensor.

13. The apparatus according to claim 11, wherein said processing circuit is further configured to turn on said first light source in response to detection of said object in said field of view of said RGB-IR image sensor and determine whether said object detected in said field of view of said RGB-IR image sensor is closer than a predefined distance from said RGB-IR image sensor.

14. The apparatus according to claim 13, wherein said processing circuit is further configured to turn on said second light source in response to said object in said field of view of said RGB-IR image sensor being closer than said predefined distance from said RGB-IR image sensor.

15. The apparatus according to claim 14, wherein said processing circuit is further configured to turn on said second light source to illuminate at least one of said person, a key pad, a touch pad, and a touch screen.

16. The apparatus according to claim 14, wherein said processing circuit is further configured to (i) perform video operations to increase resolution and zoom in on the area of interest, (ii) crop out a portion of the area of interest containing said face of said person, (iii) generate a color image of said person, and (iv) perform face recognition operations on said color image.

17. The apparatus according to claim 16, wherein said processing circuit is further configured to determine access privileges of said person based upon said face recognition operations on said color image.

18. A method of color imaging in zero and low light situations comprising the steps of:
detecting motion in a field of view of a security camera using one or more sensors, wherein said security camera comprises (i) a first light source capable of emitting infrared light to illuminate a scene, (ii) a second light source capable of emitting visible light to illuminate said scene, (iii) an RGB-IR image sensor circuit comprising an RGB-IR image sensor responsive to both infrared and visible light, and configured to generate video surveillance data comprising both infrared information and color information, and (iv) a processing circuit coupled to said first light source, said second light source, and said RGB-IR image sensor circuit, and configured to control said first light source, said second light source, and said RGB-IR image sensor circuit;

automatically turning on said first light source capable of emitting infrared light and said RGB-IR image sensor circuit in response to detection of said motion in said field of view of said security camera, wherein said processing circuit is configured to (i) process said video surveillance data of said scene arranged as video frames, (ii) generate a composite image comprising both said infrared information and said color information, (iii) utilize a directional selection circuit of a video processing pipeline of said processing circuit to analyze signals comprising at least audio signals generated from sounds picked up in a field of view monitored by the RGB-IR image sensor by one or more sensors coupled to said processing circuit to determine directional information of an object in the field of view of said security camera, (iv) utilize said directional information to identify a corresponding location of an area of interest in said video frames, and (v) apply a person detection operation to said infrared information in said area of interest utilizing a neural network trained to separate people from other objects to identify a source of the sounds;

determining a distance between said object in said field of view of said security camera by applying one or more image processing operations on said video surveillance data using said processing circuit coupled to said RGB-IR image sensor circuit; and when said distance is less than a predefined distance, turning on said second light source capable of emitting visible light and using said RGB-IR image sensor circuit and said processing circuit to generate a color image comprising both said infrared information and said color information, wherein said RGB-IR image sensor being responsive to said infrared light emitted by said first light source reduces an amount of visible light illumination needed to obtain said color information.

19. The method according to claim 18, wherein:
when said object is determined to be a person, (i) performing video operations to increase resolution and zoom in on the area of interest, (ii) cropping out a portion of the area of interest of said color image containing a face of said person, and (iii) performing face recognition operations on said cropped out portion of said color image.

20. The method according to claim 19, further comprising determining access privileges of said person based upon said face recognition operations on said color image.

* * * * *